United States Patent [19]
Toda

[11] Patent Number: 6,060,812
[45] Date of Patent: May 9, 2000

[54] ULTRASONIC TOUCH-POSITION SENSING DEVICE

[76] Inventor: Kohji Toda, 1-49-18 Futaba, Yokosuka 239, Japan, 239

[21] Appl. No.: 08/904,724

[22] Filed: Aug. 1, 1997

[51] Int. Cl.[7] .................................................. H01L 41/08
[52] U.S. Cl. .................................. 310/313 R; 310/313 B
[58] Field of Search .......................... 310/313 R, 313 B, 310/313 D; 73/596, 597, 599, 617, 632, 643, 655, 23.2, 24.01; 333/150–155, 193–196

[56] References Cited

U.S. PATENT DOCUMENTS

| | | | |
|---|---|---|---|
| 5,838,088 | 11/1998 | Toda | 310/313 R |
| 5,850,118 | 12/1998 | Toda | 310/313 R |
| 5,886,452 | 3/1999 | Toda | 310/313 R |
| 5,973,438 | 10/1999 | Toda | 310/313 R X |
| 5,994,817 | 11/1999 | Toda | 310/313 R |
| 6,005,327 | 12/1999 | Toda | 310/313 R |

*Primary Examiner*—Mark O. Budd

[57] ABSTRACT

An ultrasonic touch-position sensing device comprising a piezoelectric substrate, an input interdigital transducer T formed at the middle of a lower end surface of the piezoelectric substrate, four output interdigital transducers $R_1$, $R_2$, $R_3$ and $R_4$, a nonpiezoelectric plate, and a signal controller connected with output terminals of the output interdigital transducers. The interdigital transducers $R_1$ and $R_2$, are formed at one edge of the lower end surface of the piezoelectric substrate, and the interdigital transducers $R_3$ and $R_4$, are formed at the other edge thereof. Each output interdigital transducer is placed such that the finger direction thereof is slanting to that of the interdigital transducer T. A lower end surface of the nonpiezoelectric plate is cemented on an upper end surface of the piezoelectric substrate, causing a bilayer assembly. An upper end surface of the nonpiezoelectric plate consists of four areas $S_1$, $S_2$, $S_3$ and $S_4$. When an electric signal is applied to the interdigital transducer T, an SH wave is excited in the bilayer assembly. The SH wave is transduced to an electric signal by each output interdigital transducer, the electric signal being not delivered at each output interdigital transducer.

13 Claims, 14 Drawing Sheets

ULTRASONIC TOUCH-POSITION SENSING DEVICE

BACKGROUND OF THE INVENTION

1. Field of the Invention

The present invention relates to an ultrasonic device for sensing a touch-position.

2. Description of the Prior Art

A pointing device used for assisting the role of a keyboard is available as a means of producing an image or moving the image on a display panel. One of conventional pointing devices is, for example, the device named mouse. When producing or moving an image on a display panel by using the mouse, it is necessary to move the mouse itself on a plane, such as a rubber board, with some extent. Thus, an image based on evaluation with respect to a moving direction and a moving distance of the mouse on the plane is made on the display panel. However, since a point on the plane is not always placed on the corresponding point on the display panel, much of the work the mouse does is wasted. In addition, because of difficulty in controlling the mouse minutely, it often takes much time to produce an image on the display panel.

Thus, conventional pointing devices considerably waste time and energy on producing or moving an image on the display panel, moreover, have the difficulty on realizing a small-sized and simple structure.

SUMMARY OF THE INVENTION

An object of the present invention is to provide an ultrasonic touch-position sensing device capable of producing an image or moving the image on a display panel with a high sensitivity and a quick response time.

Another object of the present invention is to provide an ultrasonic touch-position sensing device excellent in manufacturing and mass-production.

A still other object of the present invention is to provide an ultrasonic touch-position sensing device operating under low power consumption with low voltage.

A still further object of the present invention is to provide an ultrasonic touch-position sensing device having a small-sized circuit with a simple structure which is very light in weight.

According to one aspect of the present invention there is provided an ultrasonic touch-position sensing device comprising a piezoelectric substrate having an upper- and a lower end surfaces running perpendicular to the direction of the thickness d thereof, an input interdigital transducer T formed at the middle of the lower end surface of the piezoelectric substrate, two output interdigital transducers $R_1$ and $R_2$, formed at one edge of the lower end surface of the piezoelectric substrate and opposed to the interdigital transducer T, two output interdigital transducers $R_3$ and $R_4$, formed at the other edge of the lower end surface of the piezoelectric substrate and opposed to the interdigital transducer T, a nonpiezoelectric plate having an upper- and a lower end surfaces running perpendicular to the thickness direction thereof, and a signal controller, output terminals of the interdigital transducers $R_1$, $R_2$, $R_3$ and $R_4$, being connected with the signal controller. The polarization axis of the piezoelectric substrate is parallel to the finger direction of the interdigital transducer T. The interdigital transducer T has an interdigital periodicity P and an overlap length L, the thickness d of the piezoelectric substrate being smaller than the interdigital periodicity P. Each of the interdigital transducers $R_1$, $R_2$, $R_3$ and $R_4$, is placed such that the finger direction thereof is slanting to that of the interdigital transducer T by an angle $\alpha$. An interdigital periodicity $P_N$ along the vertical direction to the finger direction of each of the interdigital transducers $R_1$, $R_2$, $R_3$ and $R_4$, is equal to the product of the interdigital periodicity P and cos $\alpha$. An overlap length $L_P$ along the finger direction of each of the interdigital transducers $R_1$, $R_2$, $R_3$ and $R_4$, is equal to the product of at most half the overlap length L and sec $\alpha$. The lower end surface of the nonpiezoelectric plate is cemented on the upper end surface of the piezoelectric substrate, the upper end surface of the piezoelectric substrate being under electrically opened condition. The upper end surface of the nonpiezoelectric plate consists of a first area $S_1$ between the interdigital transducers T and $R_1$, a second area $S_2$ between the interdigital transducers T and $R_2$, a third area $S_3$ between the interdigital transducers T and $R_3$, and a fourth area $S_4$ between the interdigital transducers T and $R_4$. The piezoelectric substrate and the nonpiezoelectric plate form a bilayer assembly.

When an electric signal with a frequency approximately corresponding to the interdigital periodicity P is applied to the interdigital transducer T, an SH wave (shear horizontal wave) of the zeroth mode and the higher order modes is excited in the bilayer assembly, an SH wave having a displacement, of which direction is parallel to the upper- and the lower end surfaces of the piezoelectric substrate. The SH wave having the wavelength approximately equal to the interdigital periodicity P is transduced to an electric signal by the interdigital transducers $R_1$, $R_2$, $R_3$ and $R_4$, respectively, the electric signal being not delivered at the interdigital transducers $R_1$, $R_2$, $R_3$ and $R_4$, respectively. However, if touching on the area $S_1$, $S_2$, $S_3$ or $S_4$, an electric signal $E_1$, $E_2$, $E_3$ or $E_4$ is delivered from the interdigital transducer $R_1$, $R_2$, $R_3$ or $R_4$, respectively. The signal controller senses a touch with a finger or others on the area $S_1$, $S_2$, $S_3$ or $S_4$ by an appearance of the electric signal $E_1$, $E_2$, $E_3$ or $E_4$ at the interdigital transducer $R_1$, $R_2$, $R_3$ or $R_4$, respectively, and then, moves an image on a display panel connected with an output terminal of the signal controller along a touching direction from one to the other of the areas $S_1$, $S_2$, $S_3$ and $S_4$.

According to another aspect of the present invention there is provided an ultrasonic touch-position sensing device comprising the piezoelectric substrate, the interdigital transducers T, $R_1$, $R_2$, $R_3$ and $R_4$, the nonpiezoelectric plate, and the signal controller, and further comprising an output interdigital transducer $R_0$ with the same interdigital periodicity as the interdigital periodicity P, and an amplifier, an output terminal of the interdigital transducer $R_0$ being connected with an input terminal of the interdigital transducer T via the amplifier. The interdigital transducer $R_0$ is formed on the other edge of the lower end surface of the piezoelectric substrate and placed such that the finger direction of the interdigital transducer $R_0$ runs parallel to that of the interdigital transducer T. The interdigital transducer $R_0$ transduces the SH wave excited in the bilayer assembly to an electric signal, and delivers the electric signal toward the interdigital transducer T. Thus, the interdigital transducers T and $R_0$ and the amplifier form an oscillator.

According to another aspect of the present invention there is provided an ultrasonic touch-position sensing device comprising the piezoelectric substrate, the interdigital transducers T and $R_0$, the nonpiezoelectric plate and the signal controller, and further comprising an input interdigital transducer $T_0$, output interdigital transducers $R_Y$ and $R_{-Y}$, an amplifier, and two phase comparators $C_Y$ and $C_{-Y}$. The interdigital transducers $T_0$ and T are formed at the middle of the lower end surface of the piezoelectric substrate, the polarization axis of the piezoelectric substrate being parallel to the finger direction of the interdigital transducers $T_0$ and T. The interdigital transducers $R_0$ and $R_Y$ are formed at one edge of the lower end surface of the piezoelectric substrate and opposed to the interdigital transducers $T_0$ and T, respectively. The interdigital transducers $T_0$ has the same interdigital periodicity as the interdigital periodicity P, the finger direction of the interdigital transducer $R_0$ running parallel to that of the interdigital transducer $T_0$. The interdigital transducer $R_{-Y}$ is formed at the other edge of the lower end surface of the piezoelectric substrate and opposed to the interdigital transducer T. Each of the interdigital transducers $R_Y$ and $R_{-Y}$ is placed such that the finger direction thereof is slanting to that of the interdigital transducer T by an angle α. An interdigital periodicity $P_N$ along the vertical direction to the finger direction of each of the interdigital transducers $R_Y$ and $R_{-Y}$, is equal to the product of the interdigital periodicity P and cos α. An overlap length $L_P$ along the finger direction of each of the interdigital transducers $R_Y$ and $R_{-Y}$, is equal to the product of the overlap length L and sec α as well as the product of the interdigital periodicity P and cosec α. The upper end surface of the nonpiezoelectric plate has one area between the interdigital transducers T and $R_Y$, and the other area between the interdigital transducers T and $R_{-Y}$. The area between the interdigital transducers T and $R_Y$ consists of one area $S_{YX}$ and the other area $S_{Y-X}$, The other area between the interdigital transducers T and $R_{-Y}$ consists of one area $S_{-YX}$ and the other area $S_{-Y-X}$. The area $S_{YX}$ and the area $S_{Y-X}$ are divided by a line vertical to the finger direction of the interdigital transducer T and passing the center of the overlap length L of the interdigital transducer T. The area $S_{-YX}$ and the area $S_{-Y-X}$ are also divided by the line. Output terminals of the interdigital transducers $R_Y$ and $R_{-Y}$ are connected with input terminals of the phase comparators $C_Y$ and $C_{-Y}$, respectively. An output terminal of the interdigital transducer $R_0$ is connected with input terminals of the interdigital transducers $T_0$ and T, and the phase comparators $C_Y$ and $C_{-Y}$, via the amplifier. Output terminals of the phase comparators $C_Y$ and $C_{-Y}$ are connected with the signal controller. The piezoelectric substrate and the nonpiezoelectric plate form a bilayer assembly.

When an electric signal having a frequency approximately corresponding to the interdigital periodicity P is applied to each of the interdigital transducers $T_0$ and T, an SH wave having the wavelength approximately equal to the interdigital periodicity P is excited in the bilayer assembly. The SH wave excited by the interdigital transducer $T_0$ is transduced to an electric signal with a phase $\theta_{base}$ by the interdigital transducer $R_0$, the electric signal being delivered at the interdigital transducer $R_0$ and amplified via the amplifier. A part of the amplified electric signal is applied to the interdigital transducers $T_0$ and T, again. The remains of the amplified electric signal is applied to the phase comparators $C_Y$ and $C_{-Y}$. Thus, the interdigital transducers $T_0$ and $R_0$ and the amplifier form an oscillator. The SH wave excited by the interdigital transducer T is transduced to an electric signal by each of the interdigital transducers $R_Y$ and $R_{-Y}$, the electric signal being not delivered at each of the interdigital transducers $R_Y$ and $R_{-Y}$. However, if touching on the area $S_{YX}$, $S_{Y-X}$, $S_{-YX}$ or $S_{-Y-X}$, an electric signal $E_{YX}$, $E_{Y-X}$, $E_{-YX}$ or $E_{-Y-X}$, having a phase $\theta_{YX}$, $\theta_{Y-X}$, $\theta_{-YX}$ or $\theta_{-Y-X}$, respectively, is delivered from the interdigital transducer $R_Y$ or $R_Y$. In this time, the electric signal $E_{YX}$ or $E_{Y-X}$ is delivered from the interdigital transducer $R_Y$ when touching on the area $S_{YX}$ or $S_{Y-X}$, respectively, and the electric signal $E_{-YX}$ or $E_{-Y-X}$ is delivered from the interdigital transducer $R_{-Y}$ when touching on the area $S_{-YX}$ or $S_{-Y-X}$, respectively. The electric signal $E_{YX}$ or $E_{Y-X}$ is applied to the phase comparator $C_Y$ detecting a difference between the phases $\theta_{YX}$ and $\theta_{base}$, $(\theta_{base}-\theta_{YX})$, or a difference between the phases $\theta_{Y-X}$ and $\theta_{base}$, $(\theta_{base}-\theta_{Y-X})$. The electric signal $E_{-YX}$ or $E_{-Y-X}$ is applied to the phase comparator $C_{-Y}$ detecting a difference between the phases $\theta_{-YX}$ and $\theta_{base}$, $(\theta_{base}-\theta_{-YX})$, or a difference between the phases $\theta_{-Y-X}$ and $\theta_{base}$, $(\theta_{base}-\theta_{-Y-X})$. The signal controller, for the first time, senses a touch with a finger or others on the area $S_{YX}$ or $S_{Y-X}$ by an appearance of the electric signal $E_{YX}$ or $E_{Y-X}$, respectively, at the interdigital transducer $R_Y$, and a touch with a finger or others on the area $S_{-YX}$ or $S_{-Y-X}$ by an appearance of the electric signal $E_{-YX}$ or $E_{-Y-X}$, respectively, at the interdigital transducer $R_{-Y}$. The signal controller, the next time, finds a touched one of the areas $S_{YX}$, $S_{Y-X}$, $S_{-YX}$ and $S_{-Y-X}$ by the difference $(\theta_{base}-\theta_{YX})$, the difference $(\theta_{base}-\theta_{Y-X})$, the difference $(\theta_{base}-\theta_{-YX})$, or the difference $(\theta_{base}-\theta_{-Y-X})$. And then, the signal controller moves an image on a display panel connected with an output terminal of the signal controller along a touching direction from one to the other of the areas $S_{YX}$, $S_{Y-X}$, $S_{-YX}$ and $S_{-Y-X}$.

According to another aspect of the present invention there is provided an ultrasonic touch-position sensing device comprising the piezoelectric substrate, the interdigital transducers T, $R_Y$ and $R_{-Y}$, the nonpiezoelectric plate and the signal controller, and further comprising two amplifiers $A_Y$ and $A_{-Y}$. An overlap length $L_P$ along the finger direction of each of the interdigital transducers $R_Y$ and $R_{-Y}$, is equal to the product of the overlap length L and sec α as well as the product of N times (N=1, 2, . . . , n) the interdigital periodicity P and cosec α. Output terminals of the interdigital transducers $R_Y$ and $R_{-Y}$ are connected with not only an input terminal of the interdigital transducer T via the amplifiers $A_Y$ and $A_{-Y}$, respectively, but also the signal controller. The piezoelectric substrate and the nonpiezoelectric plate form a bilayer assembly.

When an electric signal having a frequency approximately corresponding to the interdigital periodicity P is applied to the interdigital transducer T, an SH wave having the wavelength approximately equal to the interdigital periodicity P is excited in the bilayer assembly. The SH wave is transduced to an electric signal by each of interdigital transducers $R_Y$ and $R_{-Y}$, the electric signal being not delivered at each of interdigital transducers $R_Y$ and $R_{-Y}$. However, if touching on the area $S_{YX}$, $S_{Y-X}$, $S_{-YX}$ or $S_{-Y-X}$, an electric signal $E_{YX}$, $E_{Y-X}$, $E_{-YX}$ or $E_{-Y-X}$, having a frequency $f_{YX}$, $f_{Y-X}$, $f_{-YX}$ or $f_{-Y-X}$, respectively, is delivered from the interdigital transducer $R_Y$ or $R_{-Y}$. In this time, the electric signal $E_{YX}$ or $E_{Y-X}$ is delivered from interdigital transducer $R_Y$ when touching on the area $S_{YX}$ or $S_{Y-X}$, respectively, and the electric signal $E_{-YX}$ or $E_{-Y-X}$ is delivered from interdigital transducer $R_{-Y}$ when touching on the area $S_{-YX}$ or $S_{-Y-X}$, respectively. The electric signal $E_{YX}$ or $E_{Y-X}$ is amplified via the amplifier $A_Y$, a part of the amplified electric signal and the remains thereof being applied to the interdigital transducer T and the signal controller, respectively. The electric signal $E_{-YX}$ or $E_{-Y-X}$ is amplified via the amplifier $A_{-Y}$, a part of the amplified electric signal and the remains thereof being applied to the interdigital transducer T and the signal controller, respectively. Thus, either a group of the interdigital transducers T and $R_Y$ and the amplifier $A_Y$, or a group of the interdigital transducers T and $R_Y$ and the amplifier $A_Y$ forms an oscillator. The signal controller, for the first time, senses a touch with a finger or others on the area $S_{YX}$ or $S_{Y-X}$ by an appearance of the electric signal $E_{YX}$ or $E_{Y-X}$, respectively, at the interdigital transducer $R_Y$, and a touch with a finger or others on the area $S_{-YX}$ or $S_{-Y-X}$ by an appearance of the electric signal $E_{-YX}$ or $E_{-Y-X}$, respectively, at the interdigital transducer $R_{-Y}$. The signal controller, the next time, finds a touched one of the areas $S_{YX}$, $S_{Y-X}$, $S_{-YX}$ and $S_{-Y-X}$ by the frequency $f_{YX}$, $f_{Y-X}$, $f_{-X}$ or $f_{-Y-X}$. And then, the signal controller moves an image on a display panel connected with an output terminal of the signal controller along a touching direction from one to the other of the areas $S_{YX}$, $S_{Y-X}$, $S_{-YX}$ and $S_{-Y-X}$.

According to another aspect of the present invention there is provided a nonpiezoelectric plate, the thickness thereof being approximately equal to or smaller than the thickness d of the piezoelectric substrate. The nonpiezoelectric plate is made of a material such that the shear wave velocity traveling on the nonpiezoelectric plate alone is approximately equal to or lower than that traveling on the piezoelectric substrate alone.

According to other aspect of the present invention there is provided a stick mounted on the center of the upper end surface of the nonpiezoelectric plate, and a sound-absorbent plate having an upper- and a lower end surfaces. The stick is made of a material such that the shear wave velocity traveling on the stick alone is higher than that traveling on the nonpiezoelectric plate alone. The center of the lower end surface of the sound-absorbent plate is supported with the tip of the stick, thus, the sound-absorbent plate slanting, and being in contact with the upper end surface of the nonpiezoelectric plate when touching with a finger or others on the upper end surface of the sound-absorbent plate except for the center thereof.

According to a further aspect of the present invention there is provided a piezoelectric substrate made of a piezoelectric ceramic.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
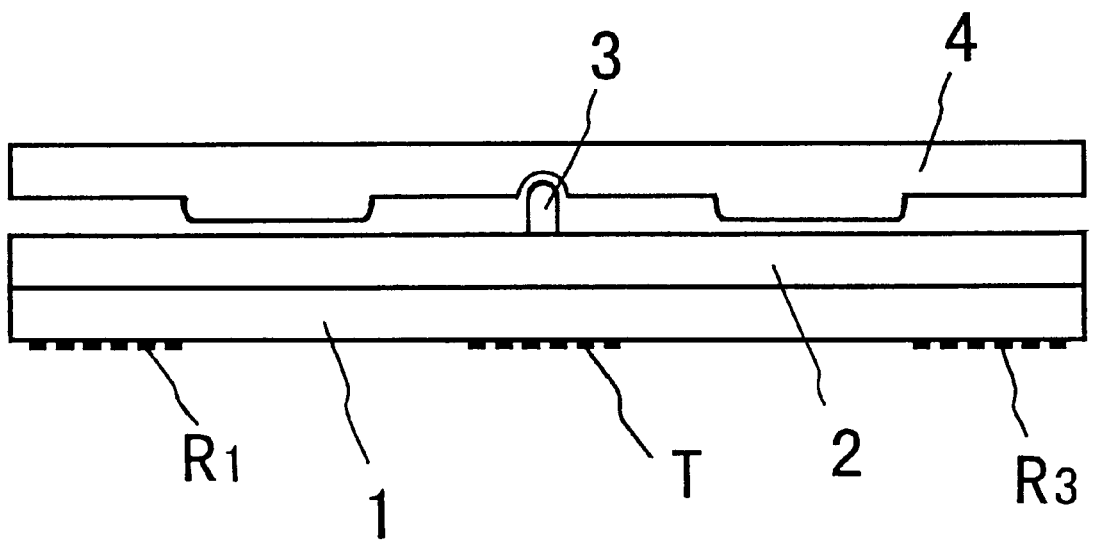
FIG. 1 shows a sectional view of an ultrasonic touch-position sensing device according to a first embodiment of the present invention.

FIG. 1 shows a sectional view of an ultrasonic touch-position sensing device according to a first embodiment of the present invention. The ultrasonic touch-position sensing device comprises piezoelectric substrate 1 having an upper- and a lower end surfaces running perpendicular to the direction of the thickness d thereof, nonpiezoelectric plate 2 having an upper- and a lower end surfaces running perpendicular to the thickness direction thereof, stick 3 mounted on the center of the upper end surface of nonpiezoelectric plate 2, sound-absorbent plate 4 having an upper- and a lower end surfaces and supported with the tip of stick 3, signal controller 5, amplifier 7, input interdigital transducer T and output interdigital transducers $R_0$, $R_1$, $R_2$, $R_3$ and $R_4$. FIG. 1 shows only piezoelectric substrate 1, nonpiezoelectric plate 2, stick 3, sound-absorbent plate 4, interdigital transducers T, $R_1$ and $R_3$. Piezoelectric substrate 1, of which material is piezoelectric ceramic, has a dimension of 0.2 mm in thickness. All the interdigital transducers, made from aluminium thin film, are formed at the lower end surface of piezoelectric substrate 1. Nonpiezoelectric plate 2, made from a glass or a polymer such as acrylate resin, teflon and plastic material, has a dimension of 0.2 mm in thickness. The lower end surface of nonpiezoelectric plate 2 is cemented on the upper end surface of piezoelectric substrate 1, the upper end surface of piezoelectric substrate 1 being under electrically opened condition. Thus, piezoelectric substrate 1 and nonpiezoelectric plate 2 form a bilayer assembly. When nonpiezoelectric plate 2 is made from a glass, the glass is cemented on all over the upper end surface of piezoelectric substrate 1 through an epoxy resin. When nonpiezoelectric plate 2 is made from a polymer, all over the upper end surface of piezoelectric substrate 1 is coated with the polymer directly. Stick 3 is made of a material such that the shear wave velocity traveling on stick 3 alone is higher than that traveling on nonpiezoelectric plate 2 alone. The center of the lower end surface of sound-absorbent plate 4 made of a material such as rubber is supported with the tip of stick 3, thus, sound-absorbent plate 4 slanting and being in contact with the upper end surface of nonpiezoelectric plate 2 when touching with a finger or others on the upper end surface of sound-absorbent plate 4 except for the center thereof.

Figure 2:
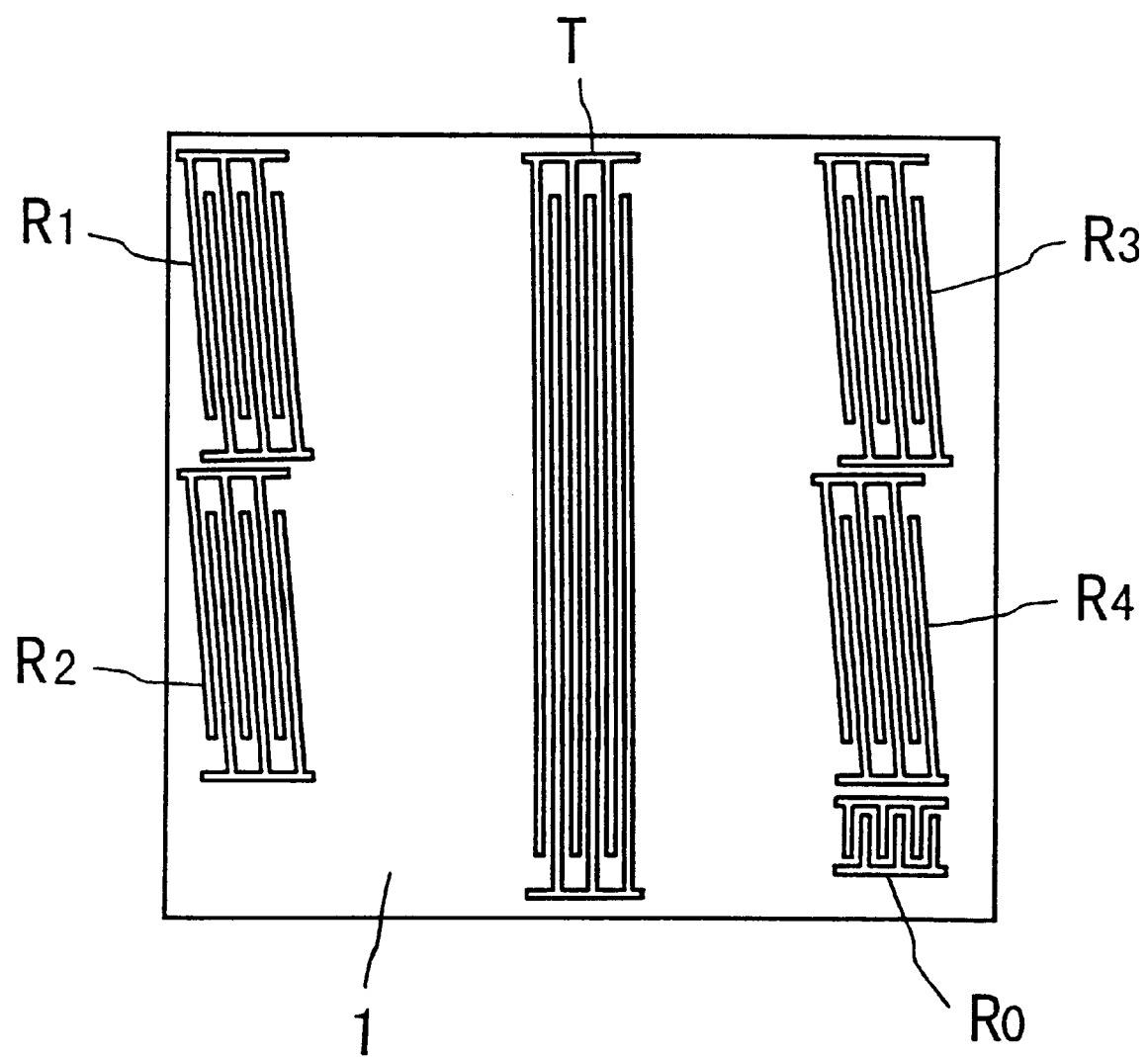
FIG. 2 shows a bottom plan view of the ultrasonic touch-position sensing device in FIG. 1.

FIG. 2 shows a bottom plan view of the ultrasonic touch-position sensing device in FIG. 1. FIG. 2 shows only piezoelectric substrate 1 and all the interdigital transducers. Interdigital transducer T having three finger pairs and formed at the middle of the lower end surface of piezoelectric substrate 1 has an interdigital periodicity P of 290 $\mu$m and an overlap length L of 12 mm. Interdigital transducers $R_1$, $R_2$, $R_3$, $R_4$ and $R_0$, have three finger pairs, respectively. Interdigital transducers $R_1$ and $R_2$ are formed at one edge of the lower end surface of piezoelectric substrate 1 and opposed to interdigital transducer T. Interdigital transducers $R_3$, $R_4$ and $R_0$ are formed at the other edge of the lower end surface of piezoelectric substrate 1 and opposed to interdigital transducer T. Interdigital transducer $R_0$ having an interdigital periodicity P of 290 μm and an overlap length of 2 mm is placed such that the finger direction of interdigital transducer $R_0$ runs parallel to that of interdigital transducer T. The finger direction of interdigital transducers $R_1$, $R_2$, $R_3$ and $R_4$ is not parallel to that of interdigital transducer T. The polarization axis of piezoelectric substrate 1 is parallel to the finger direction of interdigital transducer T. Such a directionality of a popular substrate to an interdigital transducer makes it difficult to realize the size of the popular substrate larger. However, it is possible to make the size of piezoelectric substrate 1 larger because piezoelectric substrate 1 is made from piezoelectric ceramic.

Figure 3:
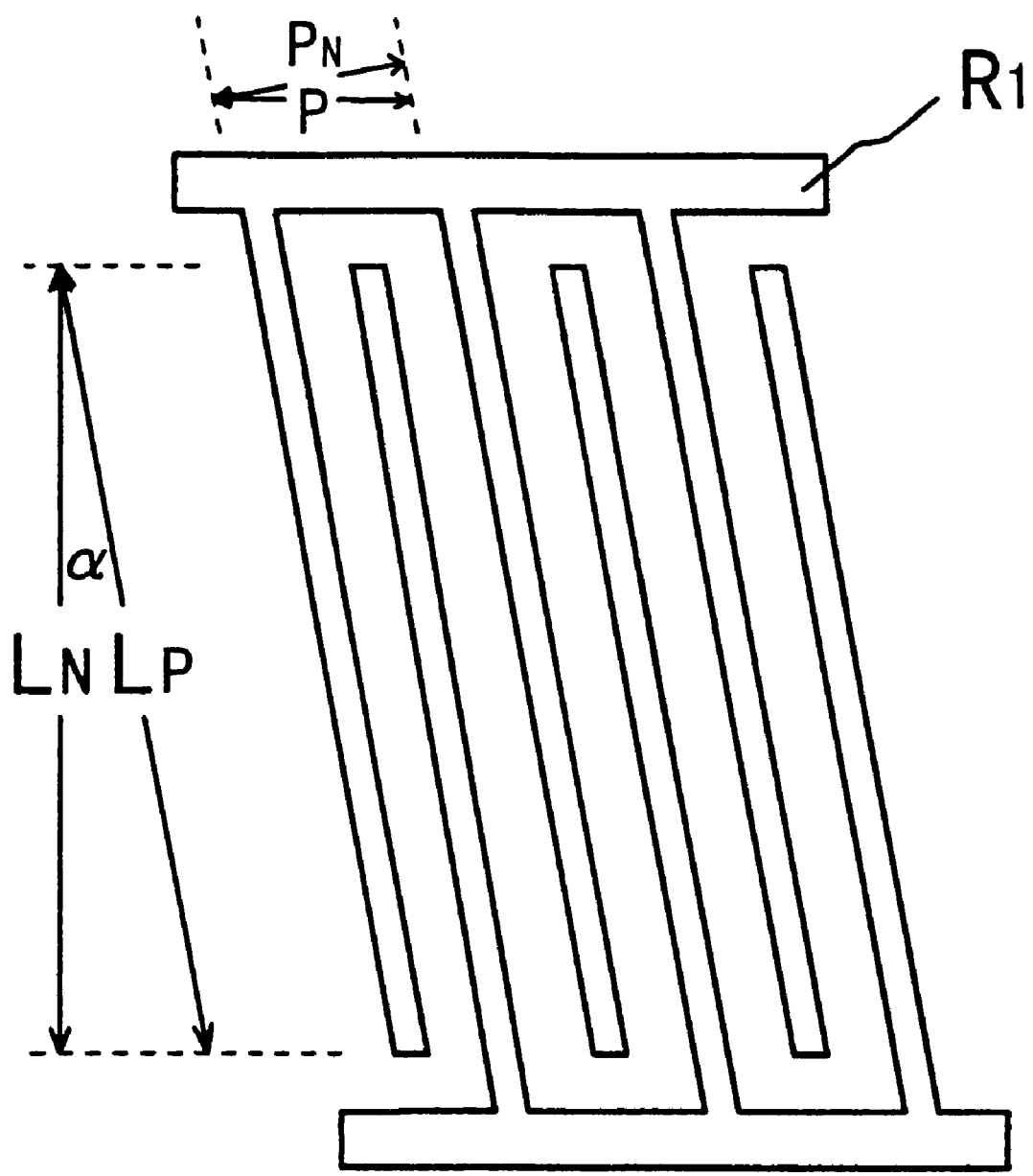
FIG. 3 shows a plan view of interdigital transducer $R_1$.

FIG. 3 shows a plan view of interdigital transducer $R_1$. Interdigital transducers $R_1$, $R_2$, $R_3$ and $R_4$ have the same constructions each other. Each of interdigital transducers $R_1$, $R_2$, $R_3$ and $R_4$, is placed such that the finger direction thereof is slanting to that of interdigital transducer T by an angle α. An interdigital periodicity $P_N$ along the vertical direction to the finger direction of each of interdigital transducers $R_1$, $R_2$, $R_3$ and $R_4$, is equal to the product of the interdigital periodicity P and cos α. Each of interdigital transducers $R_1$, $R_2$, $R_3$ and $R_4$, has an overlap length $L_P$ along the finger direction of each of interdigital transducers $R_1$, $R_2$, $R_3$ and $R_4$, and an overlap length $L_N$ of 4 mm along the finger direction of interdigital transducer T. The overlap length $L_N$ is, as shown in FIG. 2, always smaller than the half of the overlap length L. Thus, the overlap length $L_P$ is equal to the product of at most half the overlap length L and sec α.

Figure 4:
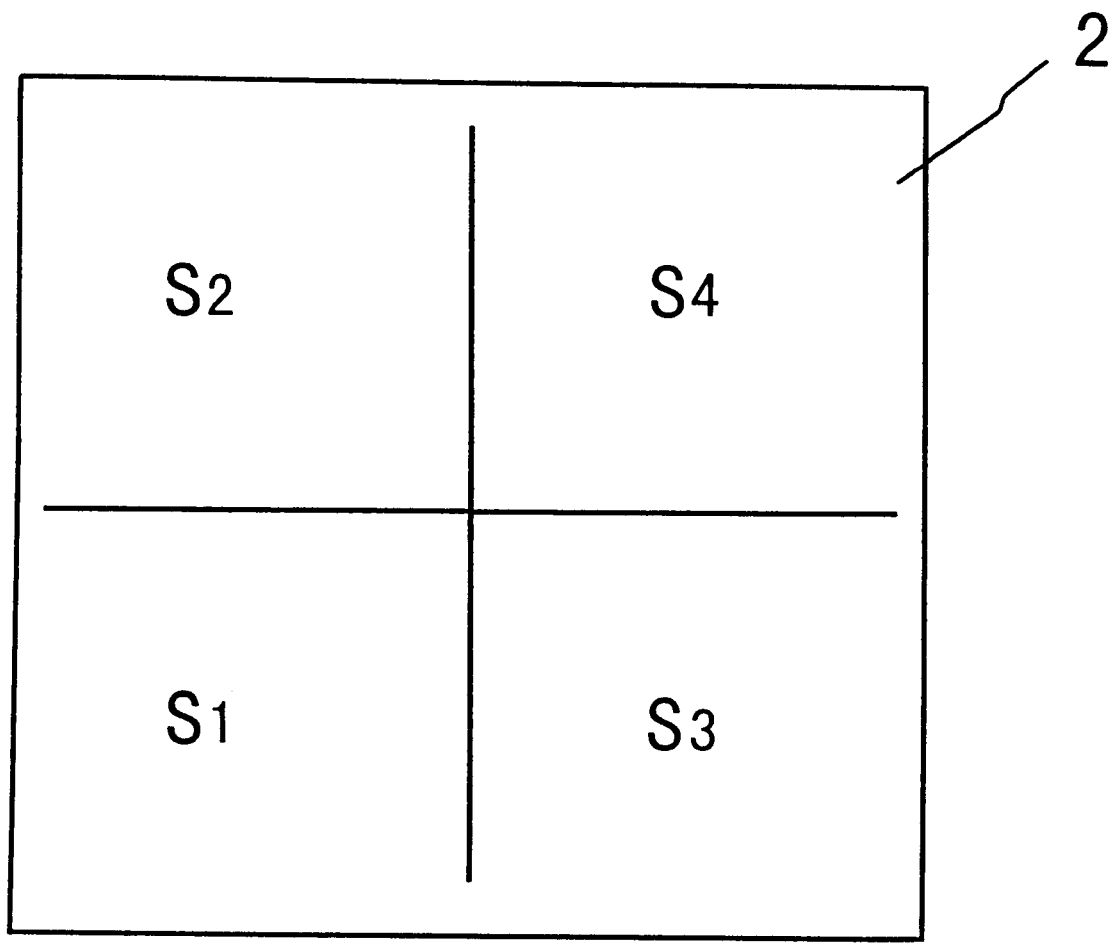
FIG. 4 shows a plan view of the upper end surface of nonpiezoelectric plate 2.

FIG. 4 shows a plan view of the upper end surface of nonpiezoelectric plate 2. The upper end surface of nonpiezoelectric plate 2 has a first area $S_1$ between interdigital transducers T and $R_1$, a second area $S_2$ between interdigital transducers T and $R_2$, a third area $S_3$ between interdigital transducers T and $R_3$, and fourth area $S_4$ between interdigital transducers T and $R_4$.

Figure 5:
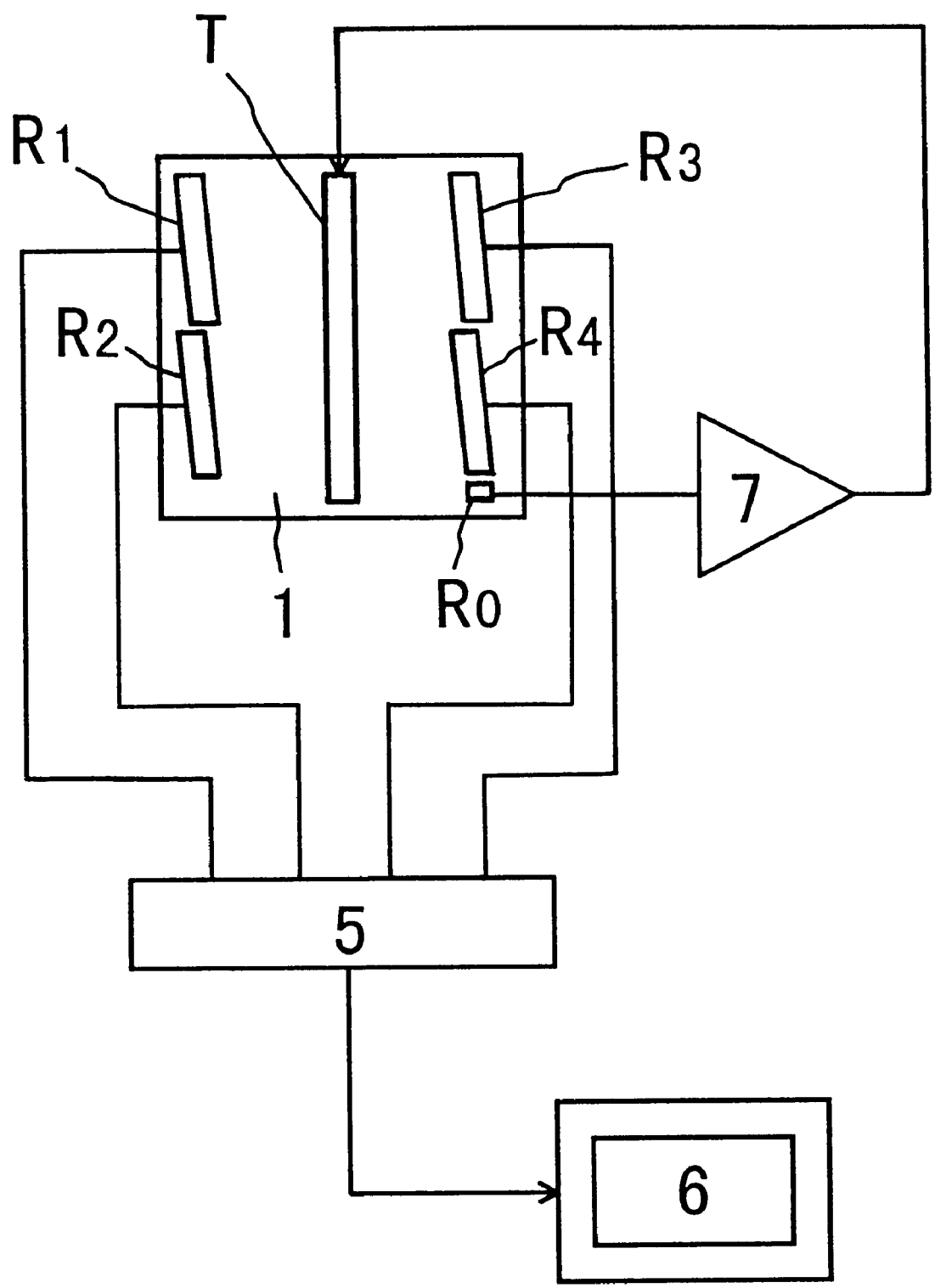
FIG. 5 shows a diagram of a driving circuit of the ultrasonic touch-position sensing device in FIG. 1.

FIG. 5 shows a diagram of a driving circuit of the ultrasonic touch-position sensing device in FIG. 1. Each output terminal of interdigital transducers $R_1$, $R_2$, $R_3$, and $R_4$, is connected with an input terminal of signal controller 5. An output terminal of signal controller 5 is connected with display panel 6. An output terminal of interdigital transducer $R_0$ is connected with an input terminal of interdigital transducer T via amplifier 7. When an electric signal having a frequency approximately corresponding to the interdigital periodicity P is applied to interdigital transducer T, an SH wave of the zeroth mode and the higher order modes is excited in the bilayer assembly. In this time, the SH wave having the wavelength approximately equal to the interdigital periodicity P can be excited effectively by employing interdigital transducer T with only three finger pairs. The SH wave is transmitted along the direction vertical to the finger direction of interdigital transducer T because the polarization axis of piezoelectric substrate 1 is parallel to the finger direction of interdigital transducer T. If the phase velocity of the SH wave is approximately equal to the average value between the shear wave velocity traveling on nonpiezoelectric plate 2 alone and that traveling on piezoelectric substrate 1 alone, the transducing efficiency from the electric signal applied to interdigital transducer T to the SH wave is very large. The transducing efficiency from an electric signal to a mechanical vibration by the SH wave is higher than that by a surface acoustic wave or that by Lamb waves. Thus, it is possible to operate the ultrasonic touch-position sensing device under low power consumption and low voltage. In addition, it is necessary for the SH wave in the bilayer assembly to be not leaked into stick 3. Thus, as mentioned above, stick 3 is made of a material such that the shear wave velocity traveling on stick 3 alone is higher than that traveling on nonpiezoelectric plate 2 alone. In order to prevent the SH wave from leaking into stick 3, it is better that stick 3 is cemented on the center of the upper end surface of nonpiezoelectric plate 2 through a resin without an electric conductivity.

In the ultrasonic touch-position sensing device in FIG. 1, the SH wave is transduced to an electric signal by interdigital transducers $R_0$, $R_1$, $R_2$, $R_3$ and $R_4$, respectively. The electric signal detected by interdigital transducer $R_0$ is delivered at interdigital transducer $R_0$. On the other hand, the electric signals detected by interdigital transducers $R_1$, $R_2$, $R_3$ and $R_4$, are not delivered at interdigital transducers $R_1$, $R_2$, $R_3$ and $R_4$, respectively. However, if touching on the upper end surface of nonpiezoelectric plate 2 through sound-absorbent plate 4, that is, if the area $S_1$, $S_2$, $S_3$ or $S_4$ comes in contact with the lower end surface of sound-absorbent plate 4, an electric signal $E_1$, $E_2$, $E_3$ or $E_4$ is delivered from interdigital transducer $R_1$, $R_2$, $R_3$ or $R_4$, respectively. Signal controller 5 senses a touch with a finger or others on the area $S_1$, $S_2$, $S_3$ or $S_4$ by an appearance of the electric signal $E_1$, $E_2$, $E_3$ or $E_4$ at interdigital transducer $R_1$, $R_2$, $R_3$ or $R_4$, respectively, and moves an image on display panel 6 along a touching direction from one to the other of the areas $S_1$, $S_2$, $S_3$ and $S_4$.

In the ultrasonic touch-position sensing device in FIG. 1, the electric signal delivered at interdigital transducer $R_0$ is amplified via amplifier 7 and is applied to interdigital transducer T, again. Thus, interdigital transducers T and $R_0$ and amplifier 7 form an oscillator, causing not only a low voltage operation and low power consumption, but also a small-sized circuit with a simple structure. In addition, the ultrasonic touch-position sensing device is not under the influence of the surroundings, such as a change in temperature.

Figure 6:
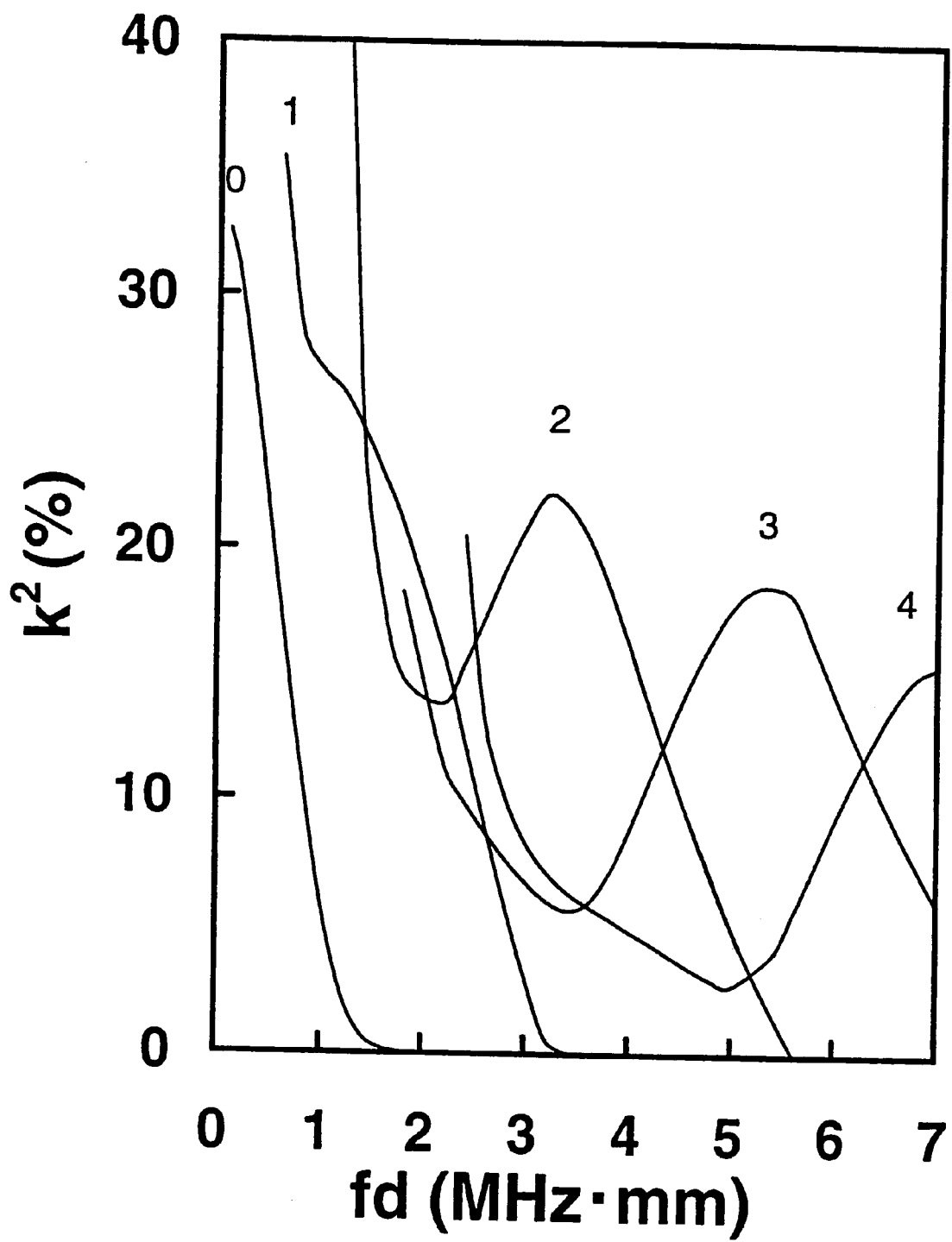
FIG. 6 shows a relationship between the $k^2$ value calculated from the difference between the phase velocity under electrically opened condition and that under electrically shorted condition of piezoelectric substrate 1, and the fd value.

FIG. 6 shows a relationship between the electromechanical coupling constant $k^2$ calculated from the difference between the phase velocity under electrically opened condition and that under electrically shorted condition of piezoelectric substrate 1 in FIG. 1, and the product fd of the frequency f of the SH wave and the thickness d of piezoelectric substrate 1. In FIG. 6, nonpiezoelectric plate 2 is made from a glass having a shear wave velocity of 1988.8 m/s traveling on the glass alone. Piezoelectric substrate 1 has a shear wave velocity of 2448.8 m/s traveling on piezoelectric substrate 1 alone. It is clear that the zeroth mode SH wave and the higher order mode SH waves, especially over the second mode SH waves, have large $k^2$ values. An electric energy applied to interdigital transducer T is most effectively transduced, for example, to the second mode SH wave when the fd value is approximately 3.3 MHz·mm, then the $k^2$ value is approximately 22.5% being the maximum value. The $k^2$ value of 22.5% is worthy in comparison that a crystallized $LiNbO_3$ used as a popular piezoelectric substrate for a surface acoustic wave has the $k^2$ value of approximately 5%.

Figure 7:
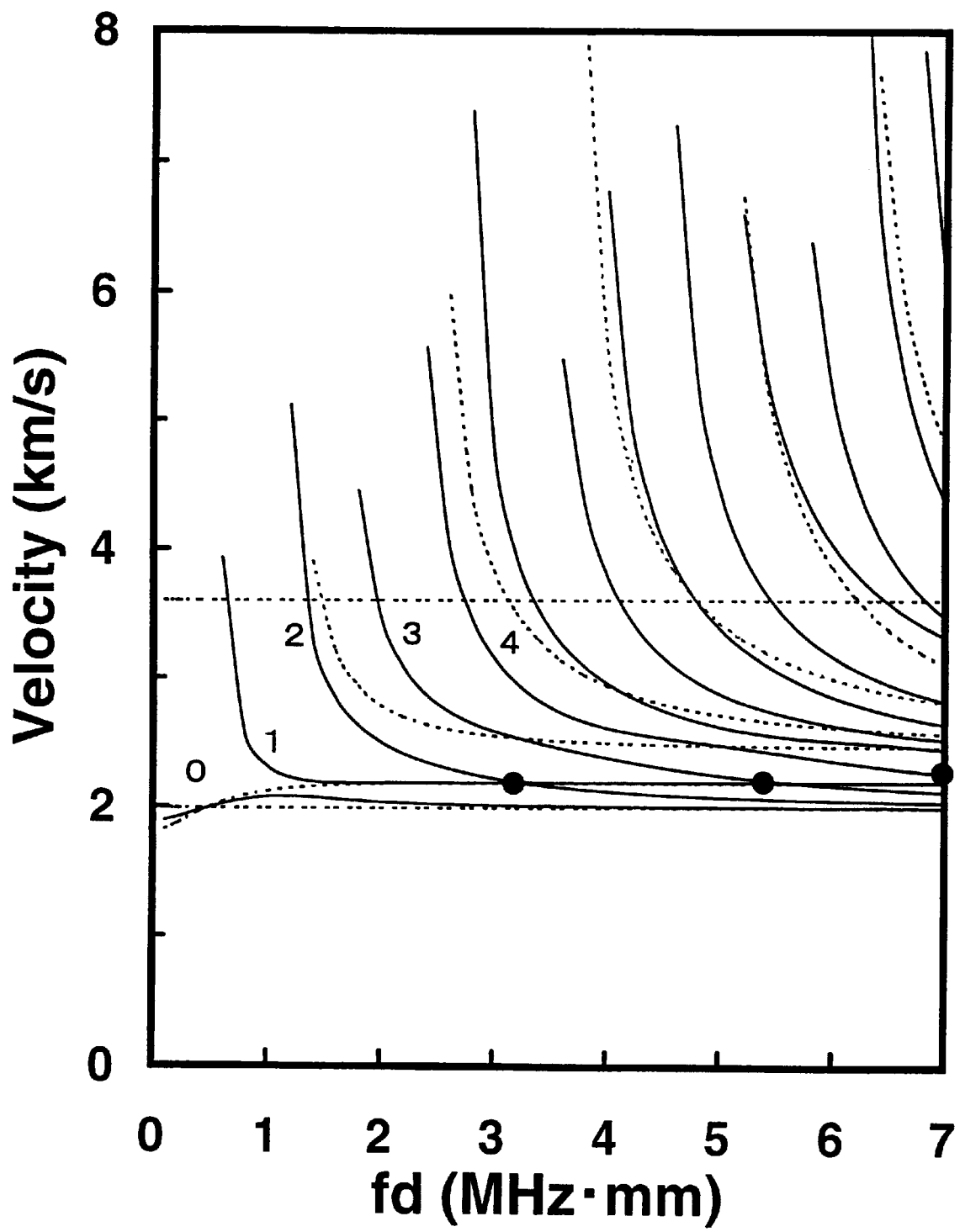
FIG. 7 shows a relationship between the phase velocity of the SH wave for each mode in the bilayer assembly, and the fd value.

FIG. 7 shows a relationship between the phase velocity of the SH wave for each mode in the bilayer assembly, and the fd value. In FIG. 7, nonpiezoelectric plate 2 is made from the same glass as FIG. 6. The fd value at each mark • has the maximum $k^2$ value where an electric energy applied to interdigital transducer T is most effectively transduced to the SH wave, the maximum $k^2$ value being obtained from FIG. 6. It is clear that the phase velocity at each mark • is approximately equal to the average velocity (2218.8 m/s)

between the shear wave velocity traveling on nonpiezoelectric plate 2 alone and that traveling on piezoelectric substrate 1 alone. Thus, the fd value, in which the phase velocity of the SH wave excited in the bilayer assembly is approximately equal to the average value between the shear wave velocity traveling on nonpiezoelectric plate 2 alone and that traveling on piezoelectric substrate 1 alone, gives the maximum $k^2$ value.

Figure 8:
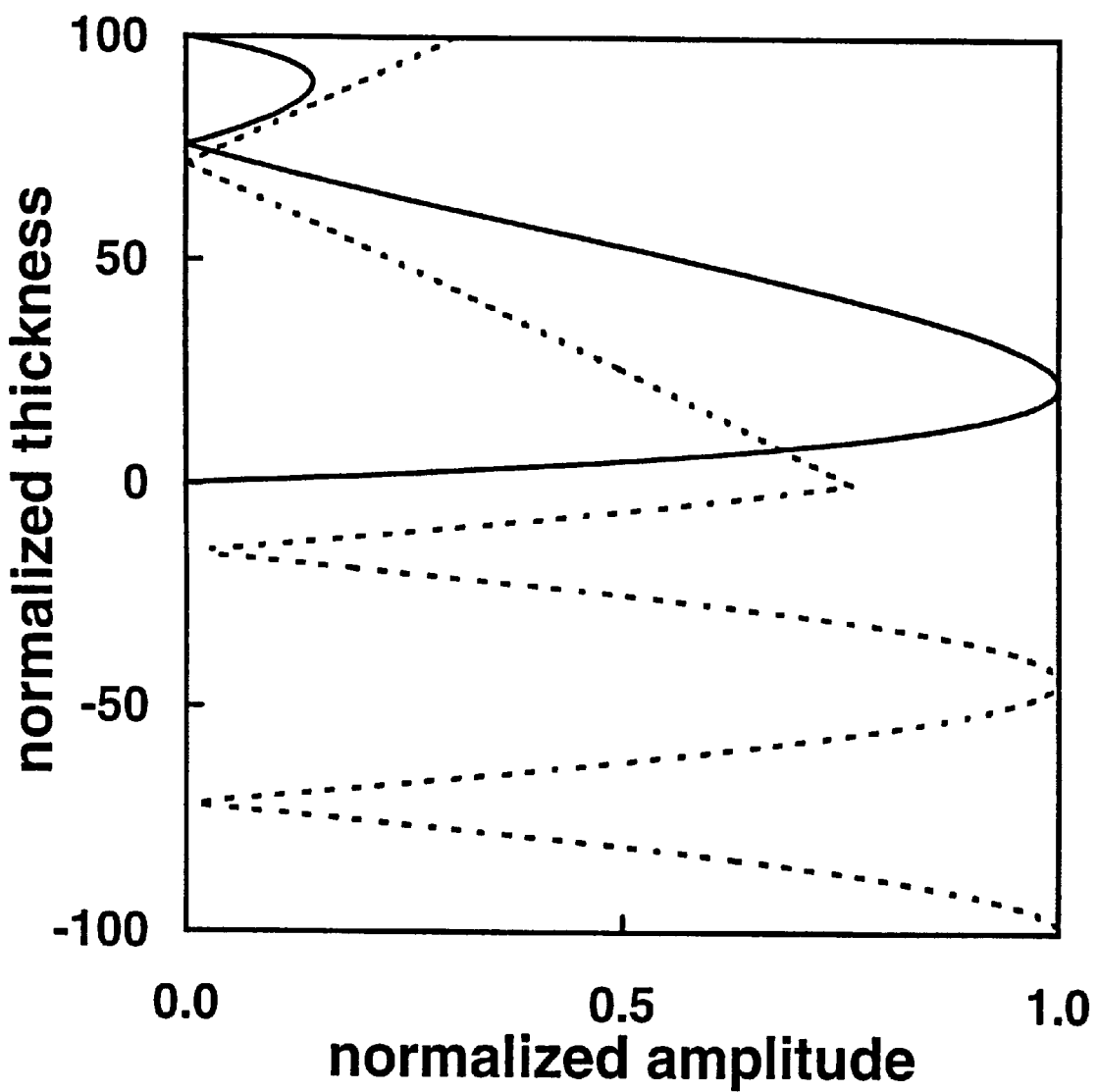
FIG. 8 shows a relationship between the thickness of the bilayer assembly, and an amplitude of a displacement or an electric potential at the fd value with the approximately maximum $k^2$ value of the third mode SH wave.

FIG. 8 shows a relationship between the thickness of the bilayer assembly, and an amplitude of a displacement or an electric potential at the fd value with the approximately maximum $k^2$ value of the third mode SH wave. The thickness and the amplitude are normalized by the maximum value, respectively. The thickness zero shows the boundary face between piezoelectric substrate 1 and nonpiezoelectric plate 2, the thickness 100 showing the boundary face between piezoelectric substrate 1 and air, the thickness −100 showing the boundary face between nonpiezoelectric plate 2 and air. A broken- and a continuous lines show the amplitude of the displacement and that of the electric potential, respectively. It is clear that the SH wave behaves like a bulk wave, in other words, the SH wave is leaked into nonpiezoelectric plate 2 effectively. The behavior of the SH wave is greatly dependent on the electrically opened condition of the boundary surface of piezoelectric substrate 1 to nonpiezoelectric plate 2. In addition, for the purpose of furthering the behavior of the SH wave, it is better that the thickness of nonpiezoelectric plate 2 is approximately equal to or smaller than the thickness d of piezoelectric substrate 1, and that nonpiezoelectric plate 2 is made of a material such that the shear wave velocity traveling on nonpiezoelectric plate 2 alone is approximately equal to or lower than that traveling on piezoelectric substrate 1 alone. Thus, it is possible to enhancing the sensitivity of the ultrasonic touch-position sensing device.

Figure 9:
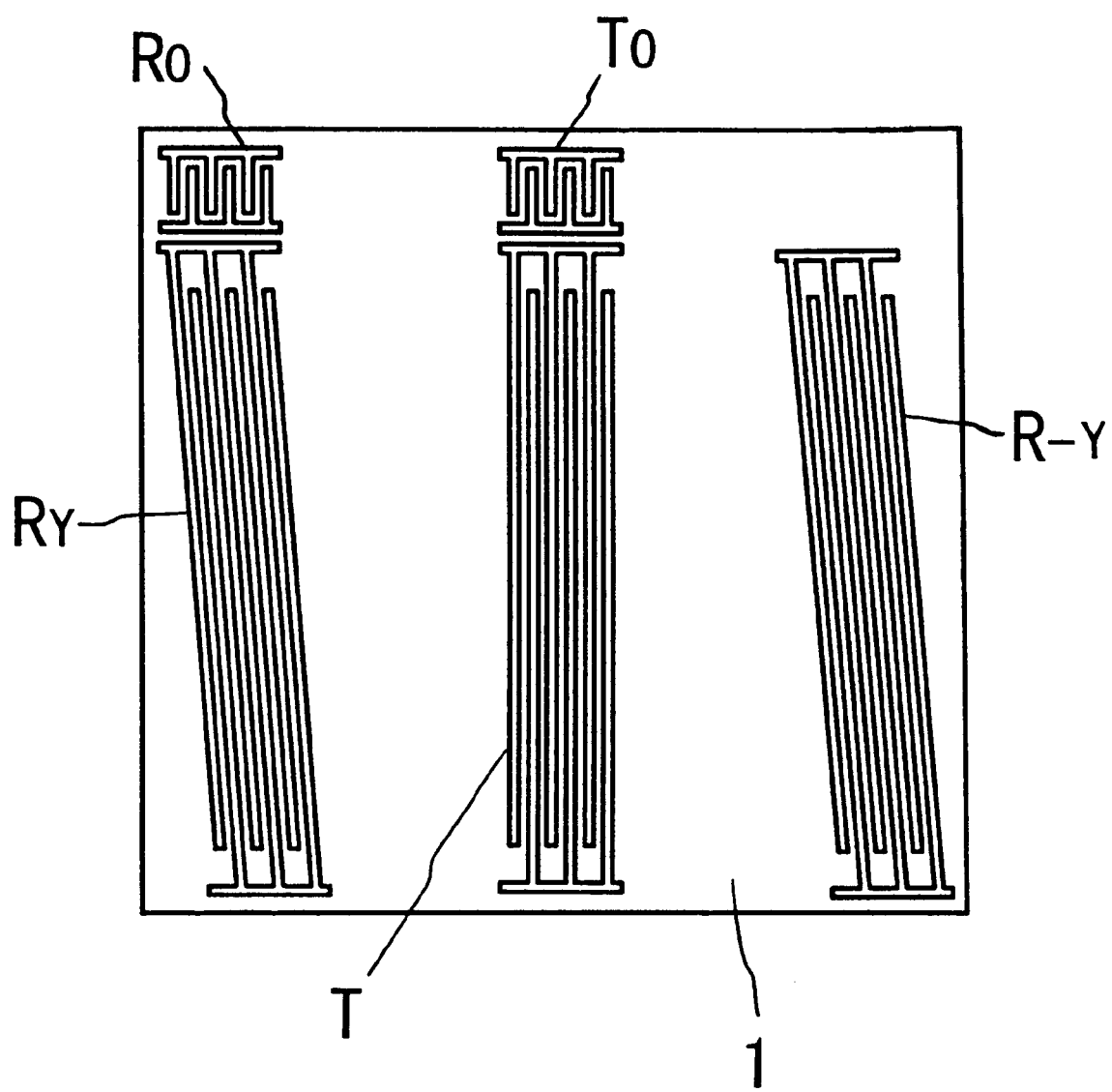
FIG. 9 shows a bottom plan view of an ultrasonic touch-position sensing device according to a second embodiment of the present invention.

FIG. 9 shows a bottom plan view of an ultrasonic touch-position sensing device according to a second embodiment of the present invention, FIG. 9 corresponding with FIG. 2. The ultrasonic touch-position sensing device in FIG. 9 comprises piezoelectric substrate 1, nonpiezoelectric plate 2, stick 3, sound-absorbent plate 4, signal controller 5, amplifier 7, phase comparators $C_Y$ and $C_{-Y}$, input interdigital transducers $T_0$ and T, and output interdigital transducers $R_0$, $R_Y$ and $R_{-Y}$. Piezoelectric substrate 1, nonpiezoelectric plate 2, stick 3, and sound-absorbent plate 4 are arranged as those in FIG. 1. FIG. 9 shows only piezoelectric substrate 1 and all the interdigital transducers. Interdigital transducers $T_0$, $R_Y$ and $R_{-Y}$, are made from aluminium thin film. All the interdigital transducers are, as in FIG. 1, formed at the lower end surface of piezoelectric substrate 1. Interdigital transducers, $T_0$ and $R_0$, having the same construction each other, are placed at the middle of the lower end surface of piezoelectric substrate 1 and at one edge thereof, respectively, such that the finger direction of interdigital transducer $R_0$ runs parallel to that of interdigital transducer $T_0$. Interdigital transducers $R_Y$ and $R_{-Y}$, have three finger pairs, respectively. Interdigital transducer $R_Y$ is placed at one edge of the lower end surface of piezoelectric substrate 1 and opposed to interdigital transducer T. Interdigital transducers $R_{-Y}$ is placed at the other edge of the lower end surface of piezoelectric substrate 1 and opposed to interdigital transducer T. The polarization axis of piezoelectric substrate 1 is parallel to the finger direction of interdigital transducers $T_0$, T and $R_0$.

Figure 10:
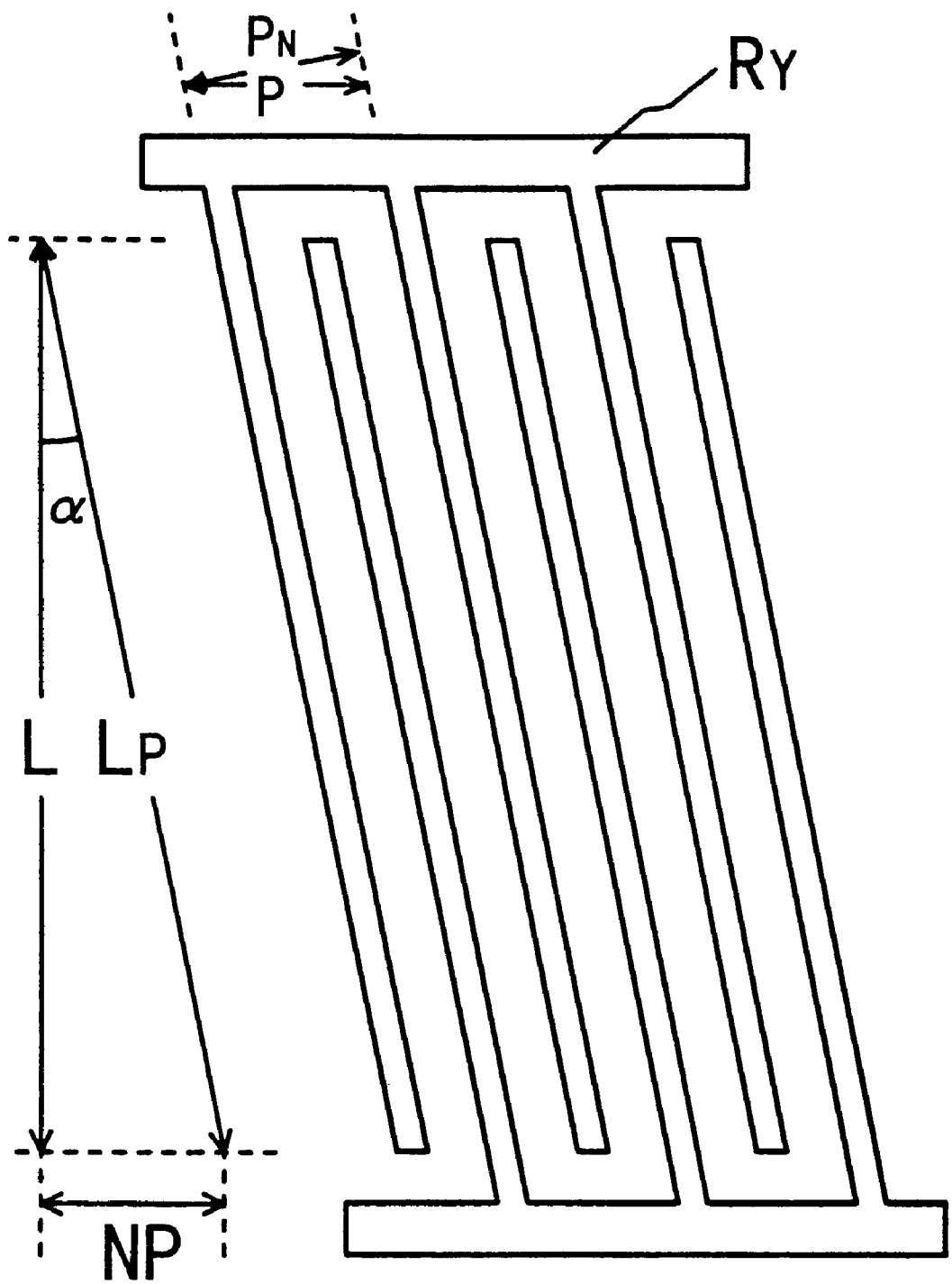
FIG. 10 shows a plan view of interdigital transducer $R_Y$.

FIG. 10 shows a plan view of interdigital transducer $R_Y$. FIG. 10 corresponding with FIG. 3. Interdigital transducers $R_Y$ and $R_{-Y}$ have the same constructions each other. Each of interdigital transducers $R_Y$ and $R_{-Y}$, is placed such that the finger direction thereof is slanting to that of interdigital transducer T by an angle $\alpha$. An interdigital periodicity $P_N$ along the vertical direction to the finger direction of each of interdigital transducers $R_Y$ and $R_{-Y}$, is equal to the product of the interdigital periodicity P and cos $\alpha$. An overlap length $L_P$ along the finger direction of each of interdigital transducers $R_Y$ and $R_{-Y}$ is equal to the product of the overlap length L and sec $\alpha$ as well as the product of N times (N=1) the interdigital periodicity P and cosec $\alpha$, NP in FIG. 10 being equal to P.

Figure 11:
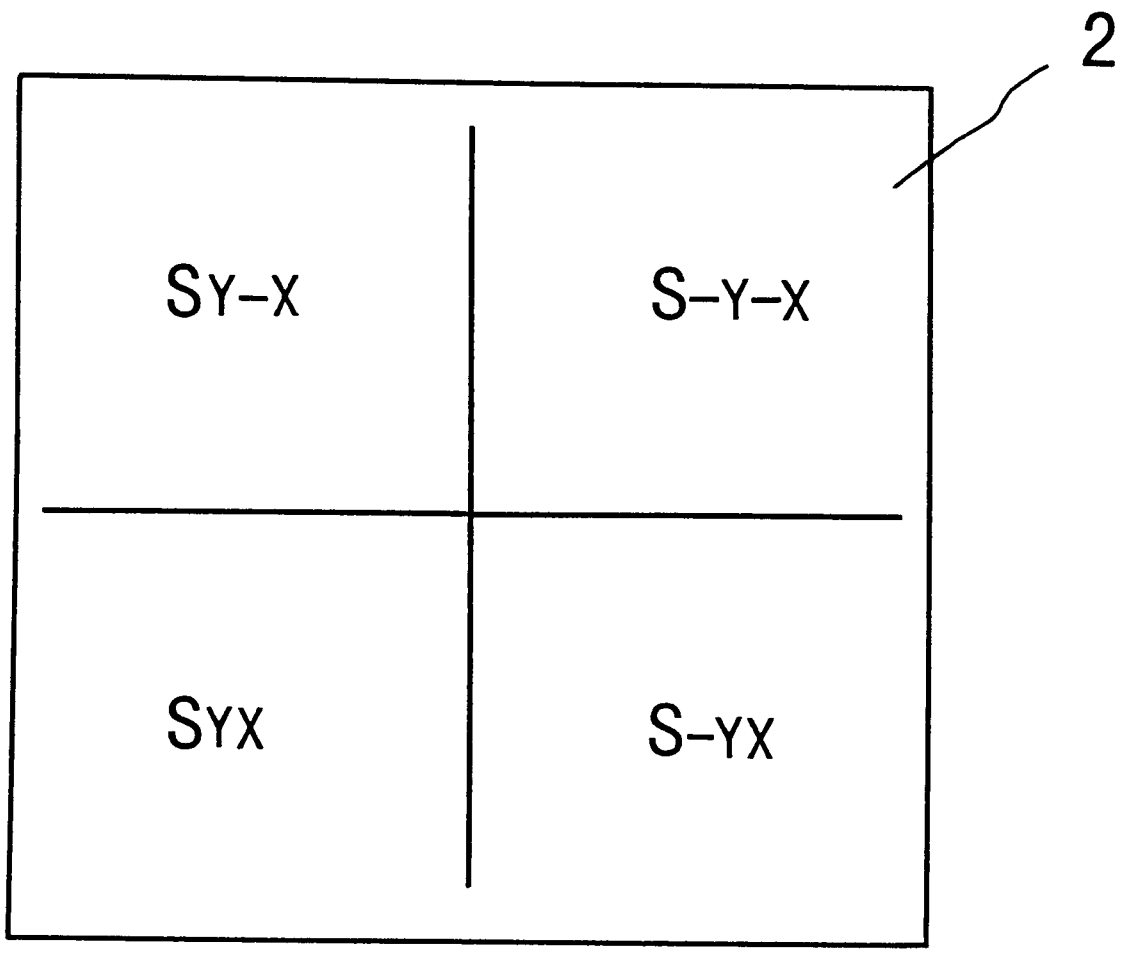
FIG. 11 shows a plan view of the upper end surface of nonpiezoelectric plate 2 in the second embodiment.

FIG. 11 shows a plan view of the upper end surface of nonpiezoelectric plate 2 in the second embodiment, FIG. 11 corresponding with FIG. 4. The upper end surface of nonpiezoelectric plate 2 has one area between interdigital transducers T and $R_Y$, and the other area between interdigital transducers T and $R_{-Y}$, the area between interdigital transducers T and $R_y$ consisting of one area $S_{YX}$ and the other area $S_{Y-X}$, the area between interdigital transducers T and $R_{-Y}$ consisting of one area $S_{-YX}$ and the other area $S_{-Y-X}$. The area $S_{YX}$ and the area $S_{Y-X}$ are divided by the line vertical to the finger direction of interdigital transducer T and passing the center of the overlap length L of interdigital transducer T. The area $S_{-YX}$ and the area $S_{-Y-X}$ are also divided by the same line.

Figure 12:
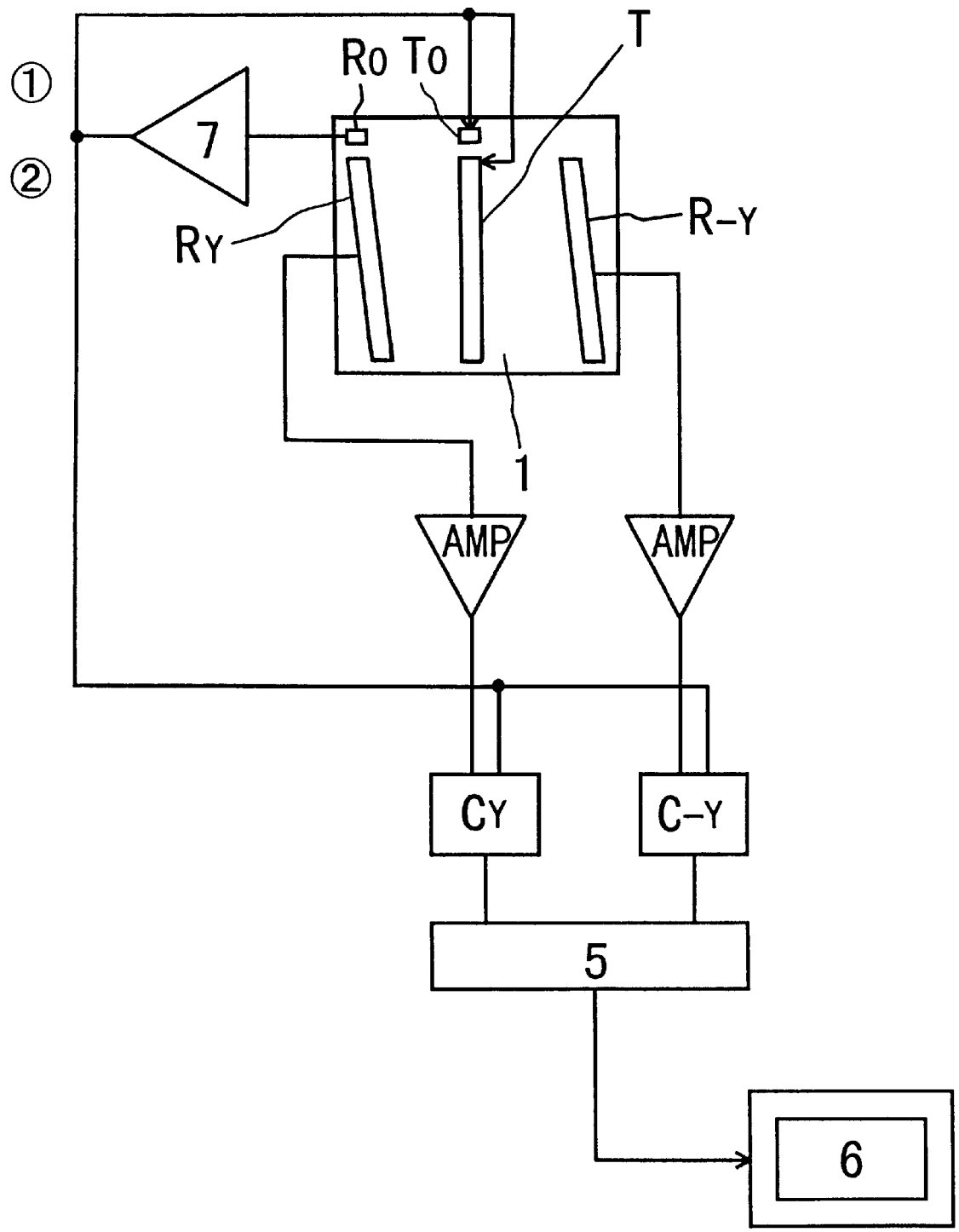
FIG. 12 shows a diagram of a driving circuit of the ultrasonic touch-position sensing device in FIG. 9.

FIG. 12 shows a diagram of a driving circuit of the ultrasonic touch-position sensing device in FIG. 9. An output terminal of interdigital transducer $R_0$ is connected with input terminals of interdigital transducers $T_0$ and T, and phase comparators $C_Y$ and $C_{-Y}$, via amplifier 7. Output terminals of interdigital transducers $R_Y$ and $R_{-Y}$, are connected with input terminals of phase comparators $C_Y$ and $C_{-Y}$, via two amplifiers AMP, respectively. Output terminals of phase comparators $C_Y$ and $C_{-Y}$, are connected with signal controller 5. An output terminal of signal controller 5 is connected with display panel 6. When an electric signal having a frequency approximately corresponding to the interdigital periodicity P is applied to each of interdigital transducers $T_0$ and T, an SH wave of the zeroth mode and the higher order modes is excited in the bilayer assembly, the SH wave having the wavelength approximately equal to the interdigital periodicity P. If the phase velocity of the SH wave is approximately equal to the average value between the shear wave velocity traveling on nonpiezoelectric plate 2 alone and that traveling on piezoelectric substrate 1 alone, the transducing efficiency from the electric signal applied to each of interdigital transducers $T_0$ and T, to the SH wave is very large. Thus, it is possible to operate the ultrasonic touch-position sensing device under low power consumption and low voltage.

In the ultrasonic touch-position sensing device in FIG. 9, the SH wave excited by interdigital transducer $T_0$ is transduced to an electric signal with a phase $\theta_{base}$ by interdigital transducer $R_0$, the electric signal being delivered at interdigital transducer $R_0$ and amplified via amplifier 7. An amplified electric signal ① is applied to interdigital transducers $T_0$ and T, again. The other amplified electric signal ② is applied to phase comparators $C_Y$ and $C_{-Y}$. Thus, interdigital transducers $T_0$ and $R_0$ and amplifier 7 form an oscillator, causing not only a low voltage operation and low power consumption, but also a small-sized circuit with a simple structure. The SH wave excited by interdigital transducer T is transduced to an electric signal by each of interdigital transducers $R_Y$ and $R_{-Y}$, the electric signal being not delivered at each of interdigital transducers $R_Y$ and $R_{-Y}$. However, if touching on the upper end surface of nonpiezoelectric plate 2 through sound-absorbent plate 4, that is, if the area $S_{YX}$, $S_{Y-X}$, $S_{-YX}$ or $S_{-Y-X}$ comes in contact with the lower end surface of sound-absorbent plate 4, an electric signal $E_{YX}$, $E_{Y-X}$, $E_{-YX}$ or $E_{-Y-X}$, having a phase $\theta_{YX}$, $\theta_{Y-X}$, $\theta_{-YX}$ or $\theta_{-Y-X}$, respectively, is delivered from interdigital transducer $R_Y$ or $R_{-Y}$. In this time, the electric signal $E_{YX}$ or $E_{Y-X}$ is delivered from interdigital transducer $R_Y$ when touching on the area $S_{YX}$ or $S_{Y-X}$, respectively, and the electric signal $E_{-YX}$ or $E_{-Y-X}$ is delivered from interdigital transducer $R_{-Y}$ when touching on the area $S_{-YX}$ or $S_{-Y-X}$, respectively. The electric signal $E_{YX}$ or $E_{Y-X}$ is amplified via amplifier AMP and applied to phase comparator $C_Y$ detecting a difference between the phases $\theta_{YX}$ and $\theta_{base}$, ($\theta_{base}-\theta_{YX}$), or a difference between the phases $\theta_{Y-X}$ and $\theta_{base}$, ($\theta_{base}-\theta_{Y-X}$). The electric signal $E_{-YX}$ or $E_{-Y-X}$ is amplified via amplifier AMP and applied to phase comparator $C_{-Y}$ detecting a difference between the phases $\theta_{-YX}$ and $\theta_{base}$, ($\theta_{base}-\theta_{YX}$), or a difference between the phases $\theta_{-Y-X}$ and $\theta_{base}$, ($\theta_{base}-\theta_{-Y-X}$). Signal controller 5, for the first time, senses a touch with a finger or others on the area $S_{YX}$ or $S_{Y-X}$ by an appearance of the electric signal $E_{YX}$ or $E_{Y-X}$, respectively, at interdigital transducer $R_Y$, and a touch with a finger or others on the area $S_{-YX}$ or $S_{-Y-X}$ by an appearance of the electric signal $E_{-YX}$ or $E_{-Y-X}$, respectively, at interdigital transducer $R_{-Y}$. Signal controller 5, the next time, finds a touched one of the areas $S_{YX}$, $S_{Y-X}$, $S_{-YX}$ and $S_{-Y-X}$ by the difference ($\theta_{base}-\theta_{YX}$), the difference ($\theta_{base}-\theta_{Y-X}$), the difference ($\theta_{base}-\theta_{-YX}$), or the difference ($\theta_{base}-\theta_{-Y-X}$). And then, signal controller 5 moves an image on display panel 6 along a touching direction from one to the other of the areas $S_{YX}$, $S_{Y-X}$, $S_{-YX}$ and $S_{-Y-X}$.

Figure 13:
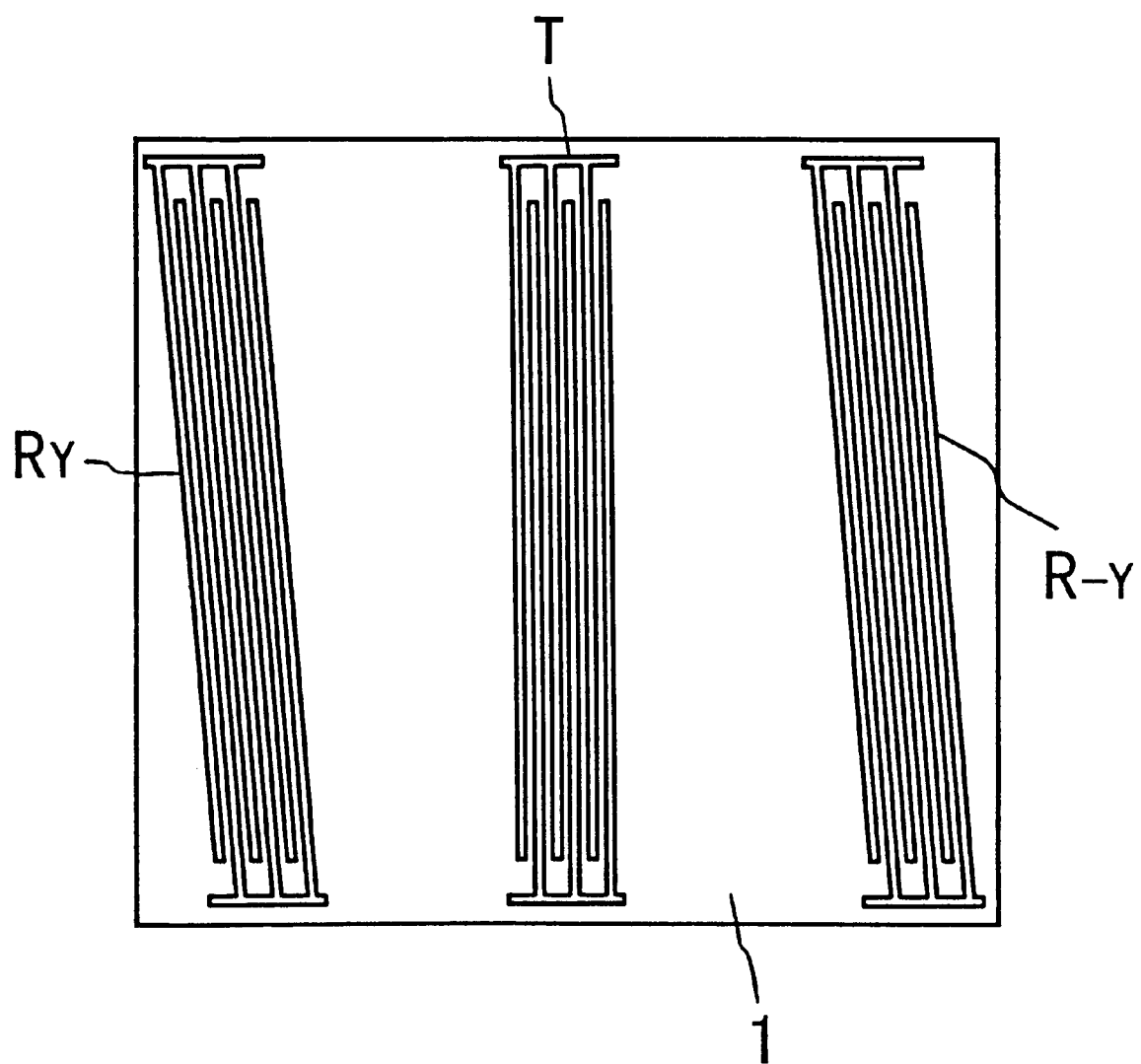
FIG. 13 shows a bottom plan view of an ultrasonic touch-position sensing device according to a third embodiment of the present invention.

FIG. 13 shows a bottom plan view of an ultrasonic touch-position sensing device according to a third embodiment of the present invention, FIG. 13 corresponding with FIG. 2. The ultrasonic touch-position sensing device in FIG. 13 comprises piezoelectric substrate 1, nonpiezoelectric plate 2, stick 3, sound-absorbent plate 4, signal controller 5, amplifiers $A_Y$ and $A_{-Y}$, input interdigital transducer T and output interdigital transducers $R_Y$ and $R_{-Y}$. Piezoelectric substrate 1, nonpiezoelectric plate 2, stick 3, and sound-absorbent plate 4 are arranged as those in FIG. 1. FIG. 13 shows only piezoelectric substrate 1 and all the interdigital transducers formed at the lower end surface of piezoelectric substrate 1, as in FIG. 1. Interdigital transducer T is placed at the middle of the lower end surface of piezoelectric substrate 1, and interdigital transducers $R_Y$ and $R_{-Y}$, are placed at one edge of the lower end surface of piezoelectric substrate 1 and at the other edge thereof, respectively. The polarization axis of piezoelectric substrate 1 is parallel to the finger direction of interdigital transducer T. In the same way as FIG. 10, each of interdigital transducers $R_Y$ and $R_{-Y}$ is placed such that the finger direction thereof is slanting to that of interdigital transducer T by an angle $\alpha$. An interdigital periodicity $P_N$ along the vertical direction to the finger direction of each of interdigital transducers $R_Y$ and $R_{-Y}$ is equal to the product of the interdigital periodicity P and cos $\alpha$. An overlap length $L_P$ along the finger direction of each of interdigital transducers $R_Y$ and $R_{-Y}$ is equal to the product of the overlap length L and see $\alpha$ as well as the product of N times (N=1, 2, . . . , n)) the interdigital periodicity P and cosec $\alpha$. The upper end surface of nonpiezoelectric plate 2 has, in the same way as FIG. 11, four areas $S_{YX}$, $S_{Y-X}$, $S_{-YX}$ and $S_{-Y-X}$.

Figure 14:
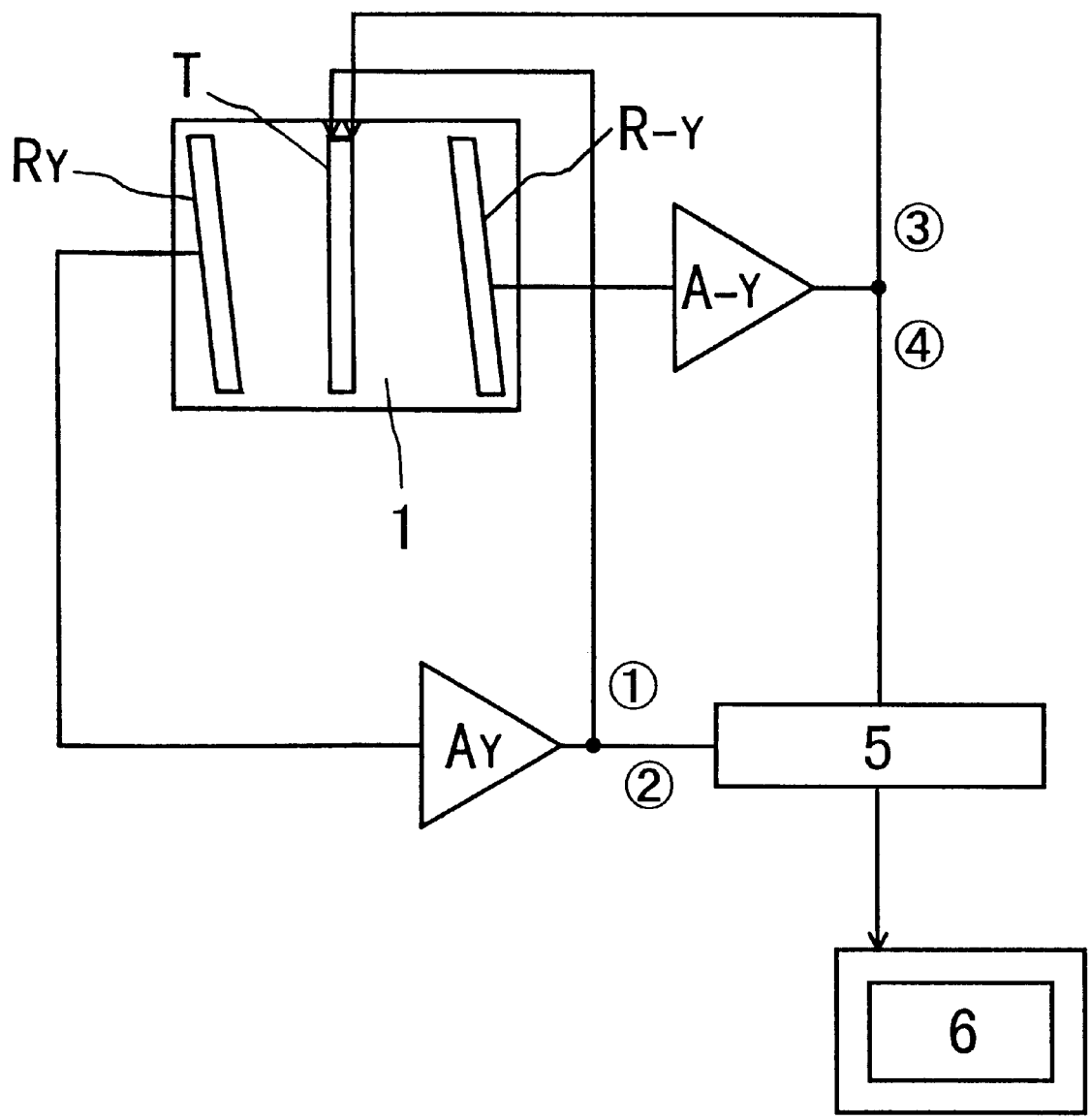
FIG. 14 shows a diagram of a driving circuit of the ultrasonic touch-position sensing device in FIG. 14.

FIG. 14 shows a diagram of a driving circuit of the ultrasonic touch-position sensing device in FIG. 14. Output terminals of interdigital transducers $R_Y$ and $R_{-Y}$, are connected with not only an input terminal of interdigital transducer T but also signal controller 5, via amplifiers $A_Y$ and $A_{-Y}$, respectively. An output terminal of signal controller 5 is connected with display panel 6. When an electric signal having a frequency approximately corresponding to the interdigital periodicity P is applied to interdigital transducer T, an SH wave of the zeroth mode and the higher order modes is excited in the bilayer assembly, the SH wave having the wavelength approximately equal to the interdigital periodicity P. If the phase velocity of the SH wave is approximately equal to the average value between the shear wave velocity traveling on nonpiezoelectric plate 2 alone and that traveling on piezoelectric substrate 1 alone, the transducing efficiency from the electric signal to the SH wave is very large. Thus, it is possible to operate the ultrasonic touch-position sensing device under low power consumption and low voltage. The SH wave in the bilayer assembly is transduced to an electric signal by each of interdigital transducers $R_Y$ and $R_{-Y}$, the electric signal being not delivered at each of interdigital transducers $R_Y$ and $R_{-Y}$. However, if touching on the upper end surface of nonpiezoelectric plate 2 through sound-absorbent plate 4, that is, if the area $S_{YX}$, $S_{Y-X}$, $S_{-YX}$ or $S_{-Y-X}$ comes in contact with the lower end surface of sound-absorbent plate 4, an electric signal $E_{YX}$, $E_{Y-X}$, $E_{-YX}$ or $E_{-Y-X}$, having a frequency $f_{YX}$, $f_{Y-X}$, $f_{-YX}$ or $f_{-Y-X}$, respectively, is delivered from interdigital transducer $R_Y$ or $R_{-Y}$. In this time, the electric signal $E_{YX}$ or $E_{Y-X}$ is delivered from interdigital transducer $R_Y$ when touching on the area $S_{YX}$ or $S_{Y-X}$, respectively, and the electric signal $E_{-YX}$ or $E_{-Y-X}$ is delivered from interdigital transducer $R_{-Y}$ when touching on the area $S_{-YX}$ or $S_{-Y-X}$, respectively. The electric signal $E_{YX}$ or $E_{Y-X}$ is amplified via amplifier $A_Y$, an amplified electric signal ① and the other amplified electric signal ② being applied to interdigital transducer T and signal controller 5, respectively. The electric signal $E_{-YX}$ or $E_{-Y-X}$ is amplified via amplifier $A_{-Y}$, an amplified electric signal ③ and the other amplified electric signal ④ being applied to interdigital transducer T and signal controller 5, respectively. Thus, either a group of interdigital transducers T and $R_Y$ and amplifier $A_Y$, or a group of interdigital transducers T and $R_{-Y}$ and amplifier $A_{-Y}$ forms an oscillator, causing not only a low voltage operation and low power consumption, but also a small-sized circuit with a simple structure. Signal controller 5, for the first time, senses a touch with a finger or others on the area $S_{YX}$ or $S_{Y-X}$ by an appearance of the electric signal $E_{YX}$ or $E_{Y-X}$, respectively, at interdigital transducer $R_Y$, and a touch with a finger or others on the area $S_{-YX}$ or $S_{-Y-X}$ by an appearance of the electric signal $E_{-YX}$ or $E_{-Y-X}$, respectively, at interdigital transducer $R_{-Y}$. Signal controller 5, the next time, finds a touched one of the areas $S_{YX}$, $S_{Y-X}$, $S_{-YX}$ and $S_{-Y-X}$ by the frequency $f_{YX}$, $f_{Y-X}$, $f_{-YX}$ or $f_{-Y-X}$. And then, signal controller 5 moves an image on display panel 6 along a touching direction from one to the other of the areas $S_{YX}$, $S_{Y-X}$, $S_{-YX}$ and $S_{-Y-X}$.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An ultrasonic touch-position sensing device comprising:

a piezoelectric substrate having an upper- and a lower end surfaces running perpendicular to the direction of the thickness d thereof;

an input interdigital transducer T formed at the middle of said lower end surface of said piezoelectric substrate, the polarization axis of said piezoelectric substrate being parallel to the finger direction of said interdigital transducer T, said interdigital transducer T having an interdigital periodicity P and an overlap length L, the thickness d of said piezoelectric substrate being smaller than said interdigital periodicity P;

two output interdigital transducers $R_1$ and $R_2$, formed at one edge of said lower end surface of said piezoelectric substrate and opposed to said interdigital transducer T;

two output interdigital transducers $R_3$ and $R_4$, formed at the other edge of said lower end surface of said piezoelectric substrate and opposed to said interdigital transducer T, each of said interdigital transducers $R_1$, $R_2$, $R_3$ and $R_4$, being placed such that the finger direction thereof is slanting to that of said interdigital transducer T by an angle α, an interdigital periodicity $P_N$ along the vertical direction to the finger direction of each of said interdigital transducers $R_1$, $R_2$, $R_3$ and $R_4$, being equal to the product of said interdigital periodicity P and cos α, an overlap length $L_P$ along the finger direction of each of said interdigital transducers $R_1$, $R_2$, $R_3$ and $R_4$, being equal to the product of at most half said overlap length L and sec α;

a nonpiezoelectric plate having an upper- and a lower end surfaces running perpendicular to the thickness direction thereof, said lower end surface thereof being cemented on said upper end surface of said piezoelectric substrate, said upper end surface of said piezoelectric substrate being under electrically opened condition, said upper end surface of said nonpiezoelectric plate consisting of a first area $S_1$ between said interdigital transducers T and $R_1$, a second area $S_2$ between said interdigital transducers T and $R_2$, a third area $S_3$ between said interdigital transducers T and $R_3$, and a fourth area $S_4$ between said interdigital transducers T and $R_4$; and a signal controller, output terminals of said interdigital transducers $R_1$, $R_2$, $R_3$ and $R_4$, being connected with said signal controller;

said piezoelectric substrate and said nonpiezoelectric plate forming a bilayer assembly;

said interdigital transducer T receiving an electric signal with a frequency approximately corresponding to said interdigital periodicity P, and exciting an SH wave of the zeroth mode and the higher order modes in said bilayer assembly, said SH wave having the wavelength approximately equal to said interdigital periodicity P, the phase velocity of said SH wave being approximately equal to the average value between the shear wave velocity traveling on said nonpiezoelectric plate alone and that traveling on said piezoelectric substrate alone;

said interdigital transducer $R_1$ transducing said SH wave to an electric signal $E_1$ and delivering said electric signal $E_1$ only when touching on said area $S_1$;

said interdigital transducer $R_2$ transducing said SH wave to an electric signal $E_2$ and delivering said electric signal $E_2$ only when touching on said area $S_2$;

said interdigital transducer $R_3$ transducing said SH wave to an electric signal $E_3$ and delivering said electric signal $E_3$ only when touching on said area $S_3$;

said interdigital transducer $R_4$ transducing said SH wave to an electric signal $E_4$ and delivering said electric signal $E_4$ only when touching on said area $S_4$;

said signal controller sensing a touch with a finger or others on said area $S_1$, $S_2$, $S_3$, or $S_4$ by an appearance of said electric signal $E_1$, $E_2$, $E_3$ or $E_4$ at said interdigital transducer $R_1$, $R_2$, $R_3$ or $R_4$, respectively, and moving an image on a display panel connected with an output terminal of said signal controller along a touching direction from one to the other of said areas $S_1$, $S_2$, $S_3$ and $S_4$.

2. An ultrasonic touch-position sensing device as defined in claim 1 further comprising:

an output interdigital transducer $R_0$ with the same interdigital periodicity as said interdigital periodicity P, said interdigital transducer $R_0$ being formed on said other edge of said lower end surface of said piezoelectric substrate and placed such that the finger direction of said interdigital transducer $R_0$ runs parallel to that of said interdigital transducer T; and an amplifier, an output terminal of said interdigital transducer $R_0$ being connected with an input terminal of said interdigital transducer T via said amplifier;

said interdigital transducer $R_0$ transducing said SH wave to an electric signal and delivering said electric signal toward said interdigital transducer T;

said interdigital transducers T and $R_0$ and said amplifier forming an oscillator.

3. An ultrasonic touch-position sensing device as defined in claim 1, wherein the thickness of said nonpiezoelectric plate is approximately equal to or smaller than said thickness d of said piezoelectric substrate, said nonpiezoelectric plate being made of a material such that the shear wave velocity traveling on said nonpiezoelectric plate alone is approximately equal to or lower than that traveling on said piezoelectric substrate alone.

4. An ultrasonic touch-position sensing device as defined in claim 1 further comprising:

a stick mounted on the center of said upper end surface of said nonpiezoelectric plate, said stick being made of a material such that the shear wave velocity traveling on said stick alone is higher than that traveling on said nonpiezoelectric plate alone; and a sound-absorbent plate having an upper- and a lower end surfaces, the center of said lower end surface thereof being supported with the tip of said stick, said sound-absorbent plate slanting and being in contact with said area $S_1$, $S_2$, $S_3$ or $S_4$ when touching with a finger or others on said upper end surface of said sound-absorbent plate except for the center thereof.

5. An ultrasonic touch-position sensing device as defined in claim 1, wherein said piezoelectric substrate is made of a piezoelectric ceramic.

6. An ultrasonic touch-position sensing device comprising:

a piezoelectric substrate having an upper- and a lower end surfaces running perpendicular to the direction of the thickness d thereof;

two input interdigital transducers $T_0$ and T, formed at the middle of said lower end surface of said piezoelectric substrate, the polarization axis of said piezoelectric substrate being parallel to the finger direction of said interdigital transducers $T_0$ and T, said interdigital transducer T having an interdigital periodicity P and an overlap length L, the thickness d of said piezoelectric substrate being smaller than said interdigital periodicity P, said interdigital transducer $T_0$ having the same interdigital periodicity as said interdigital periodicity P;

two output interdigital transducers $R_0$ and $R_Y$, formed at one edge of said lower end surface of said piezoelectric substrate and opposed to said interdigital transducers $T_0$ and T, respectively, said interdigital transducer $R_0$ having the same interdigital periodicity as said interdigital periodicity P, the finger direction of said interdigital transducer $R_0$ running parallel with that of said interdigital transducer $T_0$;

an output interdigital transducer $R_{-Y}$ formed at the other edge of said lower end surface of said piezoelectric substrate and opposed to said interdigital transducer T, each of said interdigital transducers $R_Y$ and $R_{-Y}$, being placed such that the finger direction thereof is slanting to that of said interdigital transducer T by an angle $\alpha$, an interdigital periodicity $P_N$ along the vertical direction to the finger direction of each of said interdigital transducers $R_Y$ and $R_{-Y}$, being equal to the product of said interdigital periodicity P and cos $\alpha$, an overlap length $L_P$ along the finger direction of each of said interdigital transducers $R_Y$ and $R_{-Y}$, being equal to the product of said overlap length L and sec $\alpha$ as well as the product of said interdigital periodicity P and cosec $\alpha$;

a nonpiezoelectric plate having an upper- and a lower end surfaces running perpendicular to the thickness direction thereof, said lower end surface thereof being cemented on said upper end surface of said piezoelectric substrate, said upper end surface of said piezoelectric substrate being under electrically opened condition, said upper end surface of said nonpiezoelectric plate having one area between said interdigital transducers T and $R_Y$, and the other area between said interdigital transducers T and $R_{-Y}$, said area between said interdigital transducers T and $R_Y$ consisting of one area $S_{YX}$ and the other area $S_{Y-X}$, said other area between said interdigital transducers T and $R_{-Y}$ consisting of one area $S_{-YX}$ and the other area $S_{-Y-X}$, said area $S_{YX}$ and said area $S_{Y-X}$ being divided by a line vertical to the finger direction of said interdigital transducer T and passing the center of the overlap length L of said interdigital transducer T, said area $S_{-YX}$ and said area $S_{-Y-X}$ being also divided by said line;

an amplifier;

two phase comparators $C_Y$ and $C_{-Y}$, output terminals of said interdigital transducers $R_Y$ and $R_{-Y}$, being connected with input terminals of said phase comparators $C_Y$ and $C_{-Y}$, respectively, an output terminal of said interdigital transducer $R_0$ being connected with input terminals of said interdigital transducers $T_0$ and T, and said phase comparators $C_Y$ and $C_{-Y}$, via said amplifier; and a signal controller, output terminals of said phase comparators $C_Y$ and $C_{-Y}$, being connected with said signal controller;

said piezoelectric substrate and said nonpiezoelectric plate forming a bilayer assembly;

each of said interdigital transducers $T_0$ and T, receiving an electric signal with a frequency approximately corresponding to said interdigital periodicity P, and exciting an SH wave of the zeroth mode and the higher order modes in said bilayer assembly, said SH wave having the wavelength approximately equal to said interdigital periodicity P, the phase velocity of said SH wave being approximately equal to the average value between the shear wave velocity traveling on said nonpiezoelectric plate alone and that traveling on said piezoelectric substrate alone;

said interdigital transducer $R_0$ transducing the SH wave excited by said interdigital transducer $T_0$ to an electric signal with a phase $\theta_{base}$, and delivering said electric signal;

said interdigital transducer $R_Y$ transducing the SH wave excited by said interdigital transducer T to an electric signal $E_{YX}$ with a phase $\theta_{YX}$ and delivering said electric signal $E_{YX}$ only when touching on said area $S_{YX}$, and transducing the SH wave excited by said interdigital transducer T to an electric signal $E_{Y-X}$ with a phase $\theta_{Y-X}$ and delivering said electric signal $E_{Y-X}$ only when touching on said area $S_{Y-X}$;

said interdigital transducer $R_{-Y}$ transducing the SH wave excited by said interdigital transducer T to an electric signal $E_{-YX}$ with a phase $\theta_{-YX}$ and delivering said electric signal $E_{-YX}$ only when touching on said area $S_{-YX}$, and transducing the SH wave excited by said interdigital transducer T to an electric signal $E_{-Y-X}$ with a phase $\theta_{-Y-X}$ and delivering said electric signal $E_{-Y-X}$ only when touching on said area $S_{-Y-X}$;

said phase comparator $C_Y$ detecting a difference between said phases $\theta_{YX}$ and $\theta_{base}$, or a difference between said phases $\theta_{Y-X}$ and $\theta_{base}$;

said phase comparator $C_{-Y}$ detecting a difference between said phases $\theta_{-YX}$ and $\theta_{base}$, or a difference between said phases $\theta_{-Y-X}$ and $\theta_{base}$;

said signal controller
sensing a touch with a finger or others on said area $S_{YX}$ or $S_{Y-X}$ by an appearance of said electric signal $E_{YX}$ or $E_{Y-X}$, respectively, at said interdigital transducer $R_Y$;

sensing a touch with a finger or others on said area $S_{-YX}$ or $S_{-Y-X}$ by an appearance of said electric signal $E_{-YX}$ or $E_{-Y-X}$, respectively, at said interdigital transducer $R_{-Y}$;

finding a touched one of said areas $S_{YX}$, $S_{Y-X}$, $S_{-YX}$ and $S_{-Y-X}$ by said difference between said phases $\theta_{YX}$ and $\theta_{base}$, said difference between said phases $\theta_{Y-X}$ and $\theta_{base}$, said difference between said phases $\theta_{-YX}$ and $\theta_{base}$, or said difference between said phases $\theta_{-Y-X}$ and $\theta_{base}$; and moving an image on a display panel connected with an output terminal of said signal controller along a touching direction from one to the other of said areas $S_{YX}$, $S_{Y-X}$, $S_{-YX}$ and $S_{-Y-X}$.

7. An ultrasonic touch-position sensing device as defined in claim 6, wherein the thickness of said nonpiezoelectric plate is approximately equal to or smaller than said thickness d of said piezoelectric substrate, said nonpiezoelectric plate being made of a material such that the shear wave velocity traveling on said nonpiezoelectric plate alone is approximately equal to or lower than that traveling on said piezoelectric substrate alone.

8. An ultrasonic touch-position sensing device as defined in claim 6 further comprising:

a stick mounted on the center of said upper end surface of said nonpiezoelectric plate, said stick being made of a material such that the shear wave velocity traveling on said stick alone is higher than that traveling on said nonpiezoelectric plate alone; and a sound-absorbent plate having an upper- and a lower end surfaces, the center of said lower end surface thereof being supported with the tip of said stick, said sound-absorbent plate slanting and being in contact with said area $S_{YX}$, $S_{Y-X}$, $S_{-YX}$ or $S_{-Y-X}$ when touching with a finger or others on said upper end surface of said sound-absorbent plate except for the center thereof.

9. An ultrasonic touch-position sensing device as defined in claim 6, wherein said piezoelectric substrate is made of a piezoelectric ceramic.

10. An ultrasonic touch-position sensing device comprising:
   a piezoelectric substrate having an upper- and a lower end surfaces running perpendicular to the direction of the thickness d thereof;
   an input interdigital transducer T formed at the middle of said lower end surface of said piezoelectric substrate, the polarization axis of said piezoelectric substrate being parallel to the finger direction of said interdigital transducer T, said interdigital transducer T having an interdigital periodicity P and an overlap length L, the thickness d of said piezoelectric substrate being smaller than said interdigital periodicity P;
   an output interdigital transducer $R_Y$ formed at one edge of said lower end surface of said piezoelectric substrate and opposed to said interdigital transducer T;
   an output interdigital transducer $R_{-Y}$ formed at the other edge of said lower end surface of said piezoelectric substrate and opposed to said interdigital transducer T, each of said interdigital transducers $R_Y$ and $R_{-Y}$, being placed such that the finger direction thereof is slanting to that of said interdigital transducer T by an angle $\alpha$, an interdigital periodicity $P_N$ along the vertical direction to the finger direction of each of said interdigital transducers $R_Y$ and $R_{-Y}$, being equal to the product of said interdigital periodicity P and cos $\alpha$, an overlap length $L_P$ along the finger direction of each of said interdigital transducers $R_Y$ and $R_{-Y}$, being equal to the product of said overlap length L and sec $\alpha$ as well as the product of N times (N=1, 2, . . . , n) said interdigital periodicity P and cosec $\alpha$;
   a nonpiezoelectric plate having an upper- and a lower end surfaces running perpendicular to the thickness direction thereof, said lower end surface thereof being cemented on said upper end surface of said piezoelectric substrate, said upper end surface of said piezoelectric substrate being under electrically opened condition, said upper end surface of said nonpiezoelectric plate having one area between said interdigital transducers T and $R_Y$, and the other area between said interdigital transducers T and $R_{-Y}$, said area between said interdigital transducers T and $R_Y$ consisting of one area $S_{YX}$ and the other area $S_{Y-X}$, said other area between said interdigital transducers T and $R_{-Y}$ consisting of one area $S_{-YX}$ and the other area $S_{-Y-X}$, said area $S_{YX}$ and said area $S_{Y-X}$ being divided by the line vertical to the finger direction of said interdigital transducer T and passing the center of the overlap length L of said interdigital transducer T, said area $S_{-YX}$ and said area $S_{-Y-X}$ being also divided by said line;
   two amplifiers $A_Y$ and $A_{-Y}$; and
   a signal controller, output terminals of said interdigital transducers $R_Y$ and $R_{-Y}$, being connected with not only an input terminal of said interdigital transducer T via said amplifiers $A_Y$ and $A_{-Y}$, respectively, but also said signal controller,
   said piezoelectric substrate and said nonpiezoelectric plate forming a bilayer assembly,
   said interdigital transducer T receiving an electric signal with a frequency approximately corresponding to said interdigital periodicity P, and exciting an SH wave of the zeroth mode and the higher order modes in said bilayer assembly, said SH wave having the wavelength approximately equal to said interdigital periodicity P, the phase velocity of said SH wave being approximately equal to the average value between the shear wave velocity traveling on said nonpiezoelectric plate alone and that traveling on said piezoelectric substrate alone;
   said interdigital transducer $R_Y$ transducing said SH wave to an electric signal $E_{YX}$ with a frequency $f_{YX}$ and delivering said electric signal $E_{YX}$ only when touching on said area $S_{YX}$, and transducing said SH wave to an electric signal $E_{Y-X}$ with a frequency $f_{Y-X}$ and delivering said electric signal $E_{Y-X}$ only when touching on said area $S_{Y-X}$;
   said interdigital transducer $R_{-Y}$ transducing said SH wave to an electric signal $E_{-YX}$ with a frequency $f_{-YX}$ and delivering said electric signal $E_{-YX}$ only when touching on said area $S_{-YX}$, and transducing said SH wave to an electric signal $E_{-Y-X}$ with a frequency $f_{-Y-X}$ and delivering said electric signal $E_{-Y-X}$ only when touching on said area $S_{-Y-X}$;
   said signal controller
      sensing a touch with a finger or others on said area $S_{YX}$ or $S_{Y-X}$ by an appearance of said electric signal $E_{YX}$ or $E_{Y-X}$, respectively, at said interdigital transducer $R_Y$;
      sensing a touch with a finger or others on said area $S_{-YX}$ or $S_{-Y-X}$ by an appearance of said electric signal $E_{-YX}$ or $E_{-Y-X}$, respectively, at said interdigital transducer $R_{-Y}$;
      finding a touched one of said areas $S_{YX}$, $S_{Y-X}$, $S_{-YX}$ and $S_{-Y-X}$ by said frequency $f_{YX}$, $f_{Y-X}$, $f_{-YX}$ or $f_{-Y-X}$; and
      moving an image on a display panel connected with an output terminal of said signal controller along a touching direction from one to the other of said areas $S_{YX}$, $S_{Y-X}$, $S_{-YX}$ and $S_{-Y-X}$.

11. An ultrasonic touch-position sensing device as defined in claim 10, wherein the thickness of said nonpiezoelectric plate is approximately equal to or smaller than said thickness d of said piezoelectric substrate, said nonpiezoelectric plate being made of a material such that the shear wave velocity traveling on said nonpiezoelectric plate alone is approximately equal to or lower than that traveling on said piezoelectric substrate alone.

12. An ultrasonic touch-position sensing device as defined in claim 10 further comprising:
   a stick mounted on the center of said upper end surface of said nonpiezoelectric plate, said stick being made of a material such that the shear wave velocity traveling on said stick alone is higher than that traveling on said nonpiezoelectric plate alone; and
   a sound-absorbent plate having an upper- and a lower end surfaces, the center of said lower end surface thereof being supported with the tip of said stick, said sound-absorbent plate slanting and being in contact with said area $S_{YX}$, $S_{Y-X}$, $S_{-X}$ or $S_{-Y-X}$ when touching with a finger or others on said upper end surface of said sound-absorbent plate except for the center thereof.

13. An ultrasonic touch-position sensing device as defined in claim 10, wherein said piezoelectric substrate is made of a piezoelectric ceramic.

* * * * *